US009273158B2

(12) United States Patent
Shea et al.

(10) Patent No.: US 9,273,158 B2
(45) Date of Patent: Mar. 1, 2016

(54) METHODS FOR PRODUCTION OF HYDROCARBONS AND OXYGEN-CONTAINING HYRDROCARBONS

(75) Inventors: Kenneth J. Shea, Irvine, CA (US); Jun Luo, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/117,819

(22) PCT Filed: May 16, 2012

(86) PCT No.: PCT/US2012/038199
§ 371 (c)(1),
(2), (4) Date: Mar. 6, 2014

(87) PCT Pub. No.: WO2012/158833
PCT Pub. Date: Nov. 22, 2012

(65) Prior Publication Data
US 2014/0200318 A1    Jul. 17, 2014

Related U.S. Application Data

(60) Provisional application No. 61/486,725, filed on May 16, 2011.

(51) Int. Cl.
*C08F 2/00* (2006.01)
*C08F 4/52* (2006.01)
(Continued)

(52) U.S. Cl.
CPC . *C08F 4/08* (2013.01); *C08G 61/04* (2013.01); *C10G 1/002* (2013.01); *C10G 2/00* (2013.01); *C10G 3/00* (2013.01); *C08G 2261/3326* (2013.01)

(58) Field of Classification Search
CPC .......... C08F 4/08; C08F 10/00; C08G 61/04; C08G 2261/3326; C07C 9/00; C08L 23/00; C09D 123/00
USPC .................................. 526/196, 348, 89, 183
See application file for complete search history.

(56) References Cited

U.S. PATENT DOCUMENTS 5,476,915 A * 12/1995 Shea et al. ..................... 528/4
5,777,070 A    7/1998 Inbasekaran et al.
(Continued)

OTHER PUBLICATIONS

Bayer, T.S., et al.; Synthesis of Methyl Halides from Biomass Using Engineered Microbes; J. Am. Chem. Soc. 2009, 131, 6508-6515 (2008).
PCT International Search Report dated Dec. 12, 2012 in related PCT Application No. PCT/US2012/038199.
Jun Luo, et al., "Hydrocarbon Waxes from a Salt in Water: The C1 Polymerization of Trimethylsulfoxonium Halide," ACS Macro Letters, 2012, vol. 1, pp. 560-563.
(Continued)

*Primary Examiner* — William Cheung
(74) *Attorney, Agent, or Firm* — Robert D. Buyan; Stout, Uxa & Buyan, LLP

(57) ABSTRACT

Environmentally friendly, energy efficient methods for making hydrocarbons, including oxygen containing hydrocarbons, linear or branched polymers, oligomers, waxes, small hydrocarbon molecules, fuels, coatings and starting materials/reactants to be used for making other hydrocarbons. A C1 carbon source, such as coal, natural gas, petroleum or biomass (including non-food biomass), is converted to the desired hydrocarbon. The reaction can be run in water, at room temperature and under atmospheric pressure. In some embodiments, the method comprises combining a) a C1 carbon source; b) water; c) an alkaline agent; and d) an alkyl Lewis acid in an amount effective to initiate or catalyze reaction of the components to form the hydrocarbon.

30 Claims, 14 Drawing Sheets

(51) Int. Cl.
   *C08F 4/44*     (2006.01)
   *C08F 210/00*   (2006.01)
   *C08F 4/08*     (2006.01)
   *C08G 61/04*    (2006.01)
   *C10G 1/00*     (2006.01)
   *C10G 2/00*     (2006.01)
   *C10G 3/00*     (2006.01)

(56) References Cited

U.S. PATENT DOCUMENTS 7,232,915 B2   6/2007   Bosch et al.
7,732,541 B2   6/2010   Le Gall et al.

OTHER PUBLICATIONS

M.L. Cox, et al., "Identification of Regional Sources of Methyl Bromide and Methyl Iodide from AGAGE Observations at Cape Grim, Tasmania", Journal of Atmospheric Chemistry, 2005: 50 (59-77).

Jun Luo et al., "Polymethylene Production from Salt and Water", ACS Meeting, Anaheim, 2011.

Jun Luo, et al., "Polyhomologation. A Living C1 Polymerization," Accounts of Chemical Research, vol. 43, No. 11, Nov. 2010, pp. 1420-1433.

* cited by examiner

METHODS FOR PRODUCTION OF HYDROCARBONS AND OXYGEN-CONTAINING HYRDROCARBONS

RELATED APPLICATION

This application is the national stage filing under 35 U.S.C. 371 of International Application No. PCT/US2012/038199, filed May 16, 2012, which claims the benefit of and right of priority to U.S. Provisional Patent Application No. 61/486,725 entitled Methods for Production of Hydrocarbons and Oxygen Containing Hydrocarbons filed May 16, 2011, the entire disclosures of each such application being expressly incorporated herein by reference.

STATEMENT REGARDING GOVERNMENT SUPPORT

This invention was made with United States Government support under Grant No. CHE•0848855 awarded by the National Science Foundation. The United States Government has certain rights in the invention.

FIELD OF THE INVENTION

The present invention relates generally to the field of polymer chemistry and more particularly to methods for synthesis of hydrocarbons of varying size or complexity.

BACKGROUND

Polyethylene (PE) waxes are hydrocarbons with a typical molecular weight range from 600 to 7000 g/mol.1,2 These materials play an important role in contemporary society, serving as components for lubricants, polishes, printing inks, paints, cosmetics, and coating products. PE waxes are produced directly by ethylene polymerization, thermal decomposition-oxidation of high molecular weight PE, and a Fischer-Tropsch process. Petroleum remains the principle carbon source for these materials.

In recent years, various alternative methods have been proposed for hydrocarbon production. One such alternative method involves the polymerization of C1 carbon sources. The boron-mediated polymerization of ylides provides for the controlled synthesis of linear and substituted linear hydrocarbon polymers. However, in this process, the reaction conditions are strictly anhydrous in hydrocarbon solvents at elevated temperatures.

The exists a need in the art for the development of new alternative methods for hydrocarbon production which use carbon sources other than petroleum and which preferably do not require strictly anhydrous reaction conditions or extreme temperatures.

SUMMARY OF THE INVENTION

Applicants have discovered a new, environmentally friendly, energy efficient approach for making hydrocarbons, including linear or branched polymers, oligomers, waxes, and small hydrocarbon molecules. The present invention provides a new reaction that can efficiently convert a C1 carbon source, which may be derived from various sources such as coal, natural gas, petroleum or biomass (including non-food biomass), to valuable hydrocarbons in water at room temperature and atmospheric pressure.

In general, the present invention provides a method for the synthesis of a hydrocarbon or oxygen-containing hydrocarbon, such as a polymer, small hydrocarbon molecule, wax, fuel, coating, starting material/reactant to be used for making another hydrocarbon, etc. Such method generally comprises the step of combining a) a C1 carbon source; b) water; c) an alkaline agent; and d) an alkyl Lewis acid in an amount effective to initiate or catalyze reaction of the components to form the hydrocarbon. In some embodiments, this reaction may be run at ambient temperature and atmospheric pressure. The C1 carbon source may comprise any suitable compound or composition containing C1 carbon, including halides (e.g., methyl halides), and may be derived from any suitable source such as coal, natural gas, petroleum or biomass (e.g., non-food biomass). Methods for deriving methyl halides and other halides from coal, natural gas and petroleum are well known. Methods for deriving methyl halides and/or other halides from biomass include microbial methods such as that described in Bayer, T. S., et al.; *Synthesis of Methyl Halides from Biomass Using Engineered Microbes*; J. AM. CHEM. SOC. 2009, 131, 6508-6515 (2008), the entire disclosure of which is included and incorporated herein by reference. The methods of the present invention may be stoichiometrically adjusted to make hydrocarbons of varying size and complexity, including small molecules, polymers, waxes, fuels, oils and coatings.

In some embodiments, the invention may be used for the manufacture of polymethylene, a surrogate of polyethylene, by a controlled polymerization reaction in water at room temperature and atmospheric pressure. The carbon source for the polymer is methyl iodide, a C1 molecule that can be derived from various sources, including non-food biomass. The methyl iodide may be "carried" by a suitable carrier, including any onium, such as sulfoxonium, sulfonium or phosphonium salt. For example, dimethylsulfoxide (DMSO) is desirable for use as a carrier in this reaction because it is readily available as a byproduct of the paper pulping industry and is not consumed in the reaction. Because the DMSO is not consumed in the reaction, it may be regenerated or reclaimed and recycled. The reaction is catalyzed or initiated by an alkyl Lewis acid, which may be an organoborane such as a trialkylborane, for example a trihexylborane. With a trialkylborane as initiator/catalyst, and non-olefin monomers (i.e. dimethylsulfoxonium methylide as the carbon source, the polyhomologation reaction produces polymethylene in a basic water solution including 50% NaOH aqueous solution containing an organic solvent including methylene chloride, or toluene at room temperature and atmosphere pressure. It is to be appreciated, however, that in some embodiments, the methods of the present invention may be carried out at elevated temperatures and/or elevated pressures. This aqueous system has similar productivity as the "normal" polyhomologation reaction in organic solvent. This work establishes that the polyhomologation reaction can afford simple hydrocarbon polymers from a non-olefin monomer in an environmentally friendly, low energy consuming process using water as the reaction medium.

Still further aspects and details of the present invention will be understood upon reading of the detailed description and examples set forth herebelow.

BRIEF DESCRIPTION OF THE DRAWINGS

The following detailed description and examples are provided for the purpose of non-exhaustively describing some, but not necessarily all, examples or embodiments of the invention, and shall not limit the scope of the invention in any way.

DETAILED DESCRIPTION AND EXAMPLES

Figure 1:
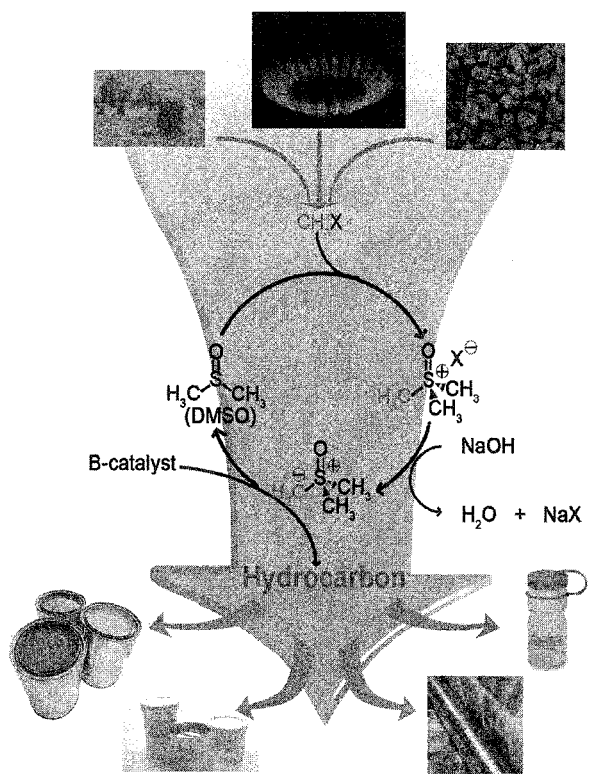
FIG. 1 is a diagram showing a catalytic cycle for the conversion of C1 carbon sources (biomass, coal, and natural gas) to synthetic polymethylene waxes, a surrogate for PE waxes, in accordance with the present invention.

The following detailed description and the accompanying drawings to which it refers are intended to describe some, but not necessarily all, examples or embodiments of the invention. The described embodiments are to be considered in all respects only as illustrative and not restrictive. The contents of this detailed description and the accompanying drawings do not limit the scope of the invention in any way.

Example 1

Hydrocarbon Production from a Salt in Water—C1 Polymerization of Salt Trimethylsulfoxonium Iodide PE waxes are hydrocarbons with a typical molecular weight range from 600 to 7,000 g/mol. These materials play an important role in contemporary society, serving as components for lubricants, polishes, printing inks, paints, cosmetics, and coating products. PE waxes are produced directly by ethylene polymerization, thermal decomposition-oxidation of high molecular weight PE and Fischer-Tropsch process. Despite the high efficiency of these process, they are energy consuming processes requiring high pressure or high temperature. Petroleum remains the principle carbon source for these materials.

For a polymer industry to be sustainable, possible replacement of petroleum-derived PE materials with biomass-based polymers is desirable. Biomass-based polymers are derived from renewable feedstocks, mainly growing plants, which are not restricted by the diminishing supplies and increasing price of petroleum feedstocks. A well-known example of a biomass-based PE replacement is BioPE, a polymer with identical structure and properties as petroleum-based PE. The only difference is that the ethylene is produced from the dehydration of ethanol. Dow-Crystalsev and Braskem-Toyota have scheduled BioPE production in 2011. Ideally, BioPE waxes with lower molecular weight can be produced in a similar manner. The biomass feedstocks utilized in this process are mostly sugar cane, sugar beet and wheat grain, major food sources for humans. The demands of an increasing human population may exacerbate the cost of producing BioPE.

A sustainable process must consider all factors that contribute to the economic and environmental cost, including the reaction medium and polymerization conditions. Water is a promising solvent for reducing the environmental impact of human activity. Moreover, due to its high heat capacity, water is a relatively safe solvent for exothermic polymerizations. These properties offer strong incentives to conduct polymerizations in water. However due to its deleterious effect on many polymerization catalysts, there are relatively few examples of hydrocarbon polymer production in water. Energy efficiency of the polymerization process is another important criterion for sustainability. Polymerizations at room temperature and atmospheric pressure consume less energy.

In an exploration of alternative methods for hydrocarbon production, Applicants have developed the polymerization of C1 carbon sources. For example, polyhomologation reaction, a boron-mediated living polymerization of ylides, results in the synthesis of linear polymethylene with no branches, controlled molecular weight, narrow molecular weight distribution with well-defined topology and composition. The carbon backbone is built one carbon at a time in contrast to two carbons in ethylene polymerization. The reaction is run in hydrocarbon solvents at elevated temperatures under strictly anhydrous conditions.

This example, which is illustrated generally in FIG. 1, describes a mild hydrocarbon production process that is environmentally friendly, conserves energy and uses renewable non-food biomass feedstocks. In this example, an aqueous polyhomologation of trimethylsulfoxonium halide salt 1 was proposed. Trialkylborane 2, the active initiator/catalyst, is actually water-stable. With the right base, the active monomer dimethylsulfoxonium methylide 3 may be produced in-situ in the aqueous solution, and could be polymerized with trialkylborane. If successful, this work could produce polymethylene from a polymerization conducted in water. The trimethylsulfoxonium halide salt is produced from a methyl halide and dimethyl sulfoxide (DMSO). Methyl halides, the C1 source for this process, can be produced from natural gas, coal, and biomass. DMSO, a byproduct of the paper pulping industry, serves as the carbon carrier in this reaction. Since it is not consumed during the process, it can be recovered and recycled. This polymerization represents a significant transformation of C1 carbon sources to a valuable hydrocarbon polymer in an environmentally friendly and energy efficient process (FIG. 1).

There are several challenges for the proposed aqueous polyhomologation of trimethylsulfoxonium halides by trialkylboranes. Schemes 1-1A and 1-1B, below, show the polymerization of dimethylsulfoxonium methylide 3 in aqueous NaOH.

Scheme 1-1A
(Initiator Production)

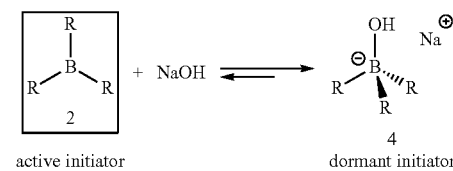

active initiator    dormant initiator

Scheme 1-1B
(Monomer Production)

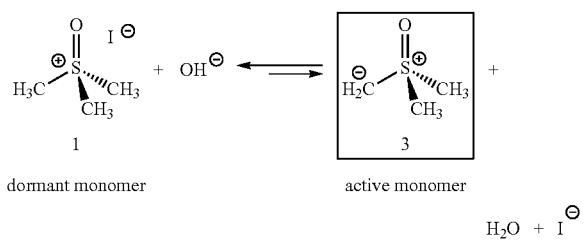

dormant monomer    active monomer

First, even through trialkylborane 2 is stable in water, it is readily complexed by hydroxide in aqueous base to produce a dormant borate complex 4 (Scheme 1-1a). The saturated complex 4 cannot react with ylide 3 to produce polymethylene. Secondly, trimethylsulfoxonium halides 1 have a higher pKa (~18)[23] than water, the in-situ production of dimethylsulfoxonium methylide 3 in aqueous base is questionable (Scheme 1-1b). In both cases, the active component for the polyhomologation reaction lies on the unfavorable side of an equilibrium.

Applicants tested the effect of aqueous NaOH solution on the polymerization of dimethylsulfoxonium methylide 3 initiated/catalyzed by trialkylborane 2. If polymethylene can be produced in aqueous NaOH solution, it proves that the trialkylborane 2 can be decomplexed from the dormant borate species 4, and would still be available for the polymerization of ylide 3 to afford polymethylene.

Dimethylsulfoxonium methylide 3 was prepared from trimethylsulfoxonium iodide ($Me_3SOI$), by ion-exchange to produce the chloride salt (Scheme 2-2). Trimethylsulfoxonium chloride was deprotonated by excess NaH to produce a homogeneous ylide solution in toluene. Solutions could be stored at −20° C. for up to 3 weeks.

Scheme 1-2, below, shows the synthesis of dimethylsulfoxonium methylide 3.

Scheme 1-2

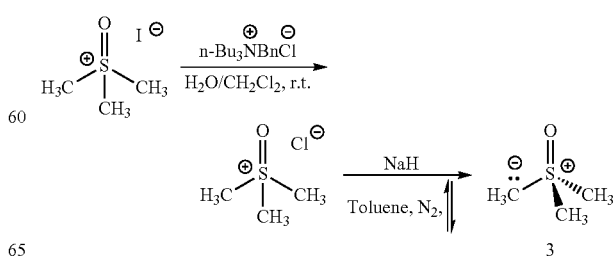

Figure 2:
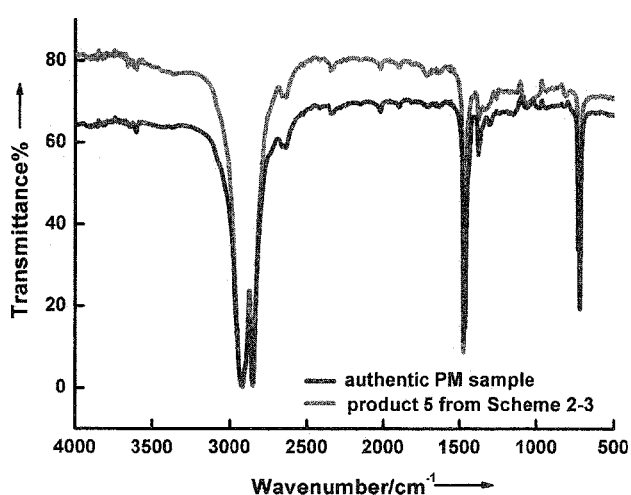
FIG. 2 shows the infrared (IR) IR spectra of standard polymethylene (blue) and polymethylene 5 (purple) produced from the polyhomologation reaction of dimethylsulfoxonium methylide 3 in 50% NaOH aqueous solution/toluene mixture described in Example 1 below.

The polymerization of dimethylsulfoxonium methylide 3 using trihexylborane 2 as the initiator/catalyst was carried out in 50% NaOH solution/toluene mixture (Scheme 2-3). After mixing the degassed toluene solution of dimethylsulfoxonium methylide 3 with degassed 50% aqueous NaOH solution, catalytic amount of trihexylborane, B(hexyl)$_3$, was added to the reaction mixture at room temperature under an atmosphere of N$_2$. After 2 h, the reaction mixture was allowed to settle. The clear aqueous portion was drawn off, and the cloudy toluene layer was precipitated in methanol to yield a white powder. By comparing its IR spectrum with that of authentic polymethylene, the white product had properties identical to polymethylene 5 (FIG. 2-2). Based on the near quantitative yield of product (95%), the monomer, dimethylsulfoxonium methylide 3, was completely consumed. The high yield of polymer 5 also implies the inhibition by hydroxide ion on the polyhomologation reaction in not significant. In aqueous 50% NaOH solution, trialkylborane 2 is still able to initiate/catalyze the polymerization of ylide 3 to afford polymethylene. Since the pKa of water is significantly lower that dimethylsulfoxonium methylide 3, addition of 3 to the aqueous solution must have resulted in the production of trimethylsulfoxonium hydroxide. To account for product formation, a low but steady concentration of ylide 3 must have been established via the deprotonation of trimethylsulfoxonium by hydroxide ion during the entire course of the reaction.

Table 1-1, below, shows a summary of Polyhomologation results of dimethylsulfoxonium methylide 3 in aqueous NaOH solution/toluene mixture.

FIG. 2 shows the IR spectra of standard polymethylene (blue) and polymethylene 5 (purple) produced from the polyhomologation reaction of dimethylsulfoxonium methylide 3 in 50% NaOH aqueous solution/toluene mixture (Table 1-1, entry 3). The standard polymethylene (blue) is produced from the traditional polyhomologation reaction (GPC results: M$_n$=45,120, M$_w$=60,130, PDI=1.33). It shows characteristic peaks for —CH$_2$— and —CH$_3$ groups at 2920, 2848, 1478, 728, 713 cm$^{-1}$. Sample polymethylene 5 (purple) has similar peaks at 2906, 2848, 1473, 730, 711 cm$^{-1}$ as standard polymethylene.

With the use of 50% NaOH solution, the polyhomologation reaction of ylide 3 provides good molecular weight control. However, to produce polymethylene 5 with higher molecular weight, longer reaction times are required. Therefore, a 24 h reaction time was used for all experiments to ensure the complete consumption of ylide 3. As shown in Table 2-1, the observed molecular weights correspond well with the theoretical values calculated from the feed ratio of ylide 3 to trihexylborane (Table 1-1, entries 2-6). The PDIs are in the range between 1.27 and 1.55. Considering the heterogeneity of the reaction, these PDIs are not bad. The reaction medium contains both toluene and water but the product polymethylene 5 does not dissolve in either solvent at room temperature so an additional polymer phase is produced at the early stage of the reaction. Despite this heterogeneous multiphase system, the polyhomologation reaction still produces polymethylene 5 with good molecular weight control in the range of 600-5,000 g/mol. Higher temperatures can be

TABLE 1-1

| Entry | NaOH Conc. (wt. %) | MW$_{th}^a$ (g/mol) | Time [h] | Yield [%] | M$_n$ (g/mol) | M$_w$ (g/mol) | PDI | T$_c$ (° C.) | T$_m$ (° C.) | Cryst. (%) |
|---|---|---|---|---|---|---|---|---|---|---|
| 1 | 50 | 1,502 | 2 | 95 | 1,223 | 1,865 | 1.52 | 115 | 122 | 57 |
| 2 | 50 | 802 | 24 | 77 | 589 | 748 | 1.27 | 103 | 109 | 67 |
| 3 | 50 | 1,502 | 24 | 82 | 1,485 | 2,308 | 1.55 | 111 | 122 | 70 |
| 4 | 50 | 2,902 | 24 | 90 | 2,279 | 3,292 | 1.44 | 115 | 125 | 75 |
| 5 | 50 | 4,302 | 24 | 93 | 3,727 | 5,355 | 1.44 | 115 | 126 | 71 |
| 6 | 50 | 5,702 | 24 | 84 | 5,162 | 7,224 | 1.40 | 115 | 126 | 69 |
| 7 | 30 | 1,502 | 24 | 88 | 1,451 | 2,666 | 1.84 | 113 | 124 | 70 |
| 8 | 15 | 1,502 | 24 | 58 | 1,137 | 1,538 | 1.35 | 106 | 116 | 53 |
| 9 | 10 | 1,502 | 24 | 28 | 780 | 900 | 1.15 | 96 | 107 | 46 |
| 10 | 5 | 1,502 | 24 | 0 | — | — | — | — | — | — |
| 11 | 0 | 1,502 | 24 | 0 | — | — | — | — | — | — |

$^a$MW$_{th}$ is calculated from the feed molar ratio of [3]/3[B(hexyl)$_3$].

Scheme 1-3, below, shows the polyhomologation reaction of dimethylsulfoxonium methylide 3 in 50% NaOH aqueous solution/toluene mixture.

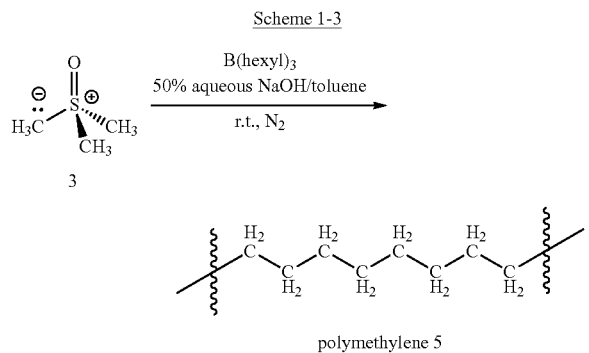

used to accelerate the reaction and, in the event higher temperatures are used, it may be appropriate or necessary to confine the reaction (e.g., run the reaction under higher pressure) to ensure the organic solvent remains as liquid at least during the critical initiation stage.

The concentration of NaOH plays an important role in polymer production (Table 1-1, entry 3 and 7-11). At least 10% of NaOH is necessary for polymer production, and 15% NaOH is required for reasonable yield in a reasonable timescale (24 h). The importance of NaOH concentration can be explained in terms of active monomer production (Scheme 1b). Before adding organoborane, methylide 3 was quenched with water to form dormant monomer trimethylsulfoxonium hydroxide. Apparently at low (<10%) concentrations of sodium hydroxide, little active monomer 3 is regenerated for the polyhomologation reaction and the yield of product would be low and the reaction time would be long. So a minimum concentration of hydroxide (>15%) is necessary to shift the monomer production equilibrium to the active methylide 3 side and supply active monomer for the polyhomologation reaction at a reasonable rate.

The morphology of the polymethylene 5 was characterized by scanning electron microscopy (SEM). Specifically, SEM was used to obtain an overview SEM image of polymethylene 5 produced from the polyhomologation reaction of dimethylsulfoxonium methylide 3 in 50% aqueous NaOH/toluene mixture, an SEM image of an individual small disc-like polymer particle, an SEM image of an individual flower-like polymer particle and a high resolution SEM image of the surface of a single petal from the flower-like particle. Based on this SEM data, the polymer 5 consists of particles with different size. There are smaller disc-like particles and larger flower-like particles coexisting in the product. Closer inspection of the smaller particles reveals that the particles are not spherical but have a flat surface top with a thin thickness, giving them a disc-like shape. Typically, heterogeneous polymerization may be expected to produce spherical particles, resulting from the minimized ratio of surface to volume. Here, the disk-like particles are formed due to the propensity of polymethylene, a linear semicrystalline polymer, to crystallize into lamellae. The polymerization temperature is approximately 100° C. below the melting temperature of polymethylene. Thus, as the polymerization proceeds, the propagating polymethylene chains undergo crystallization into lamellae. Individual lamella grows only in the X- and Y-directions. The lamellae are connected by amorphous regions and are stacked along the Z-direction in each particle, as shown in the schematic diagram of FIG. 3. Accordingly, the roughness of the surface is due to the imperfect stacks of lamellae with different diameters Applicants' SEM analysis additionally revealed that the reaction also produced larger flower-like particles with an average pseudodiameter of 3.8 μm. They all contain layers of petals, and each petal represents a layer of polymethylene crystallite comprised of stacked lamellae, just like a small disc-like particle. This is revealed by a higher resolution interrogation of the surface of the petal which shows surface roughness and an obvious stack of lamellae layers. A significant amount of toluene was used for the reaction, so polymer chains are partially swollen, and the entanglement between polymer chains often occurs. The flowers take shape as a result of the entanglement of polymer chains before they crystallize into the lamellae of adjacent petals. Due to the stacking force between petals, some layers of petals become curly instead of flat. This flower-like morphology is quite unusual, since they have only been observed by a carefully controlled crystallization under supercritical conditions.

Figure 4:
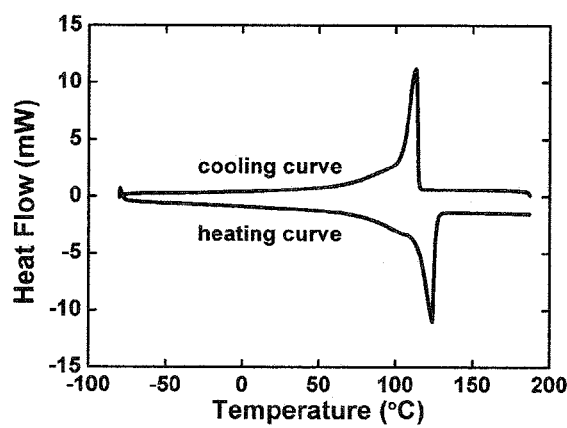
FIG. 4 is a graph showing DSC traces of polymethylene produced from the polyhomologation reaction of dimethylsulfoxonium methylide in 50% aqueous NaOH/toluene mixture as described in Example 1 below.

Differential Scanning Calorimetry (DSC) is a thermoanalytical technique which measures the amount of heat required to increase the temperature of a sample as a function of temperature. FIG. 4 shows DSC traces of the polymethylene 5 produced from the polyhomologation reaction of dimethylsulfoxonium methylide 3 in 50% aqueous NaOH/toluene mixture in this example (Table 1-1, entry 3). Both the sample and reference were maintained at nearly the same temperature throughout the experiment. Generally, the temperature program for a DSC analysis is designed such that the sample holder temperature increases linearly as a function of time. DSC measurements were used to characterize thermal and crystalline properties of polymethylene 5. As expected, by comparison to common commercial PE waxes, there is not a significant difference with respect to the melting point $T_m$ and crystallization temperature $T_c$. Polymethylene 5 has a $T_m$ of 116-126° C. and $T_c$ of 106-115° C., values typical for a low molecular weight linear polymethylene. The somewhat lower $T_m$ of 107, 109° C. and $T_c$=96, 103° C. (Table 2-1, entry 2 and 9) can be attributed to the very low molecular weight of our material polymethylene 5. A crystallinity of 46-75% was determined from the ratio of the enthalpy of the melting polymer 5 to a melt enthalpy of 281 J g$^{-1}$ for a (theoretically) 100% crystalline PE. This crystallinity is typical for linear polymethylene with similar molecular weight.

Polymerization of Trimethylsulfoxonium Iodide in Aqueous NaOH

The above-described portion of this example demonstrates that aqueous NaOH solutions are compatible with trialkylborane catalyzed polymerizations. More importantly, despite the neutralization of dimethylsulfoxonium methylide 3 in aqueous base, polymethylene 5 was produced in near quantitative yield from the polymerization of ylide 3 in an aqueous NaOH/toluene mixture. These results suggest the possibility for the polyhomologation of trimethylsulfoxonium iodide 1 in aqueous NaOH. If successful, trimethylsulfoxonium iodide 1 can be utilized directly as the carbon source for polymethylene 5. This would greatly simplify the process since it would no longer be necessary to convert from iodide salt 1 to ylide 3 through an ion-exchange reaction and deprotonation with sodium hydride (Scheme 1-2).

Applicants' studies established that the addition of catalytic amounts of trihexylborane to degassed suspensions of trimethylsulfoxonium iodide 1 in 50% aqueous NaOH containing small amounts of dichloromethane (DCM) and tetrabutylammonium iodide (TBAI) at room temperature under an atmosphere of $N_2$ produced a flocculent white material after 48 h (Scheme 1-4, below). The DCM was added to prevent precipitation of the trialkylborane in the aqueous base and the TBAI facilitates efficient initiation. After consumption of the salt, the clear aqueous portion was drawn off and the remaining white solid was washed with water and filtered. Spectroscopic analysis of the white solid established its identity as polymethylene 5 (FIGS. 2-6 and 2-7). High yields of polymer 5 (88% based on salt 1) imply efficient conversion of the C1 carbon source from trimethylsulfoxonium halide 1 to polymer 5. This reaction can be readily scaled up.

Scheme 1-4, below, shows polymerization of trimethylsulfoxonium iodide 1 in 50% NaOH aqueous solution/DCM mixture.

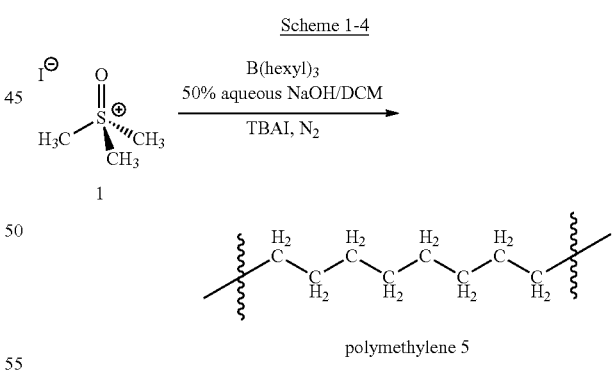

Figure 5:
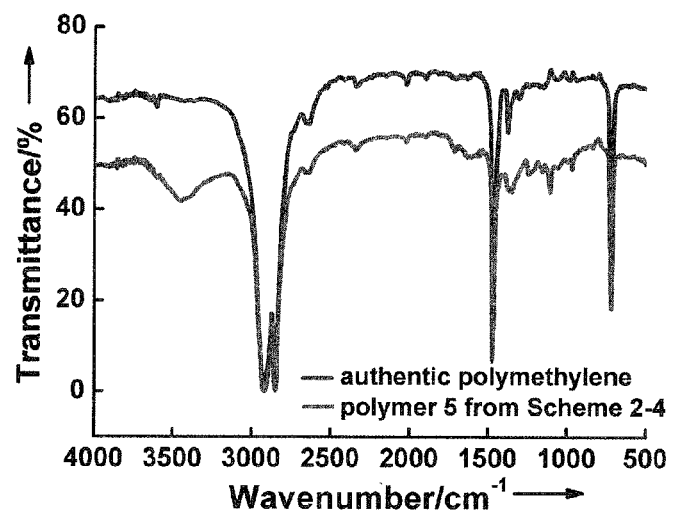
FIG. 5 shows IR spectra of a reference polymethylene sample (blue) and polymethylene (red) produced from the polymerization of trimethylsulfoxonium iodide 1 using trihexylborane as the initiator/catalyst in 50% NaOH aqueous solution/DCM mixture as described in Example 1 below.

FIG. 5 shows IR spectra of a reference polymethylene sample (blue) and polymethylene 5 (red) produced from the polymerization of trimethylsulfoxonium iodide 1 using trihexylborane as the initiator/catalyst in 50% NaOH aqueous solution/DCM mixture (Table 2, entry 1). The standard polymethylene (blue) is produced from the traditional polyhomologation reaction (GPC results: $M_n$=45,120, $M_w$=60,130, PDI=1.33). It shows diagnostic peaks for —$CH_2$— and —$CH_3$ groups at 2920, 2848, 1478, 728, 713 cm$^{-1}$. Sample polymethylene 5 (red) has similar peaks at 2906, 2843, 1472, 725, 715 cm$^{-1}$ as standard polymethylene. The peak at 3451 cm$^{-1}$ (red) indicates the existence of hydroxy functional group in the polymer product 5. The hydroxy functional group cannot be observed in the reference polymethylene sample (blue) due to the extremely low content of the terminal hydroxyl group.

Figure 6A:
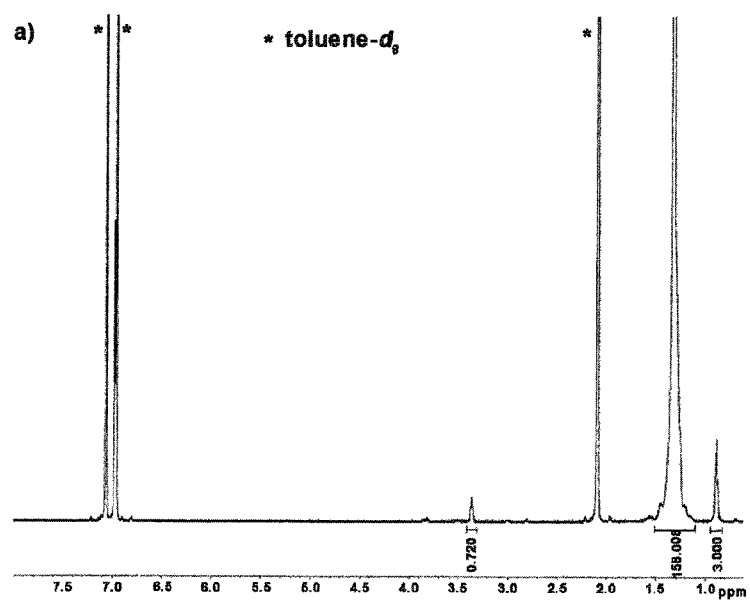
FIG. 6A shows an $^1$H NMR spectrum of polymethylene produced from trimethylsulfoxonium iodide using trihexylborane as the initiator/catalyst in 50% NaOH aqueous solution/DCM mixture as described in Example 1 below.
Figure 6B:
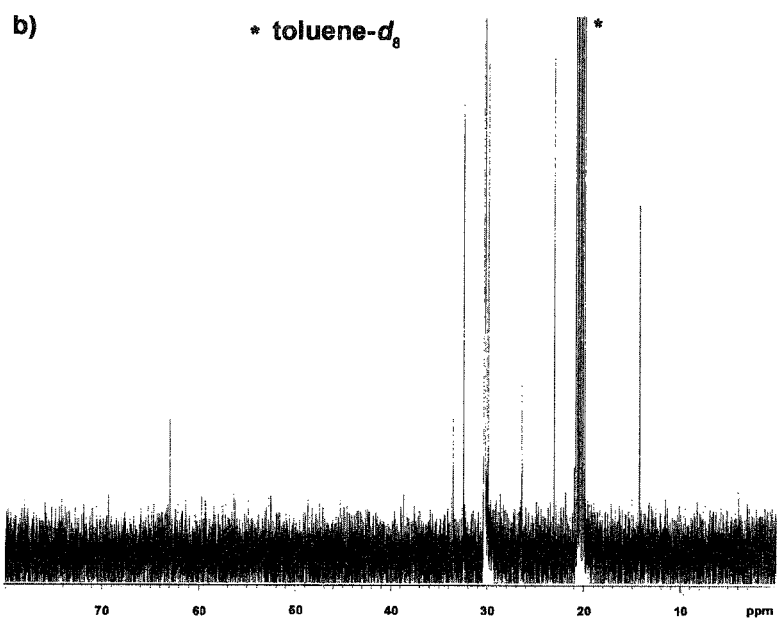
FIG. 6B shows a $^{13}$C NMR spectrum of polymethylene produced from trimethylsulfoxonium iodide using trihexylborane as the initiator/catalyst in 50% NaOH aqueous solution/DCM mixture as described in Example 1 below.

FIG. 6A shows an $^1$H NMR spectrum and FIG. 6B shows a $^{13}$C NMR spectrum of polymethylene 5 produced from trimethylsulfoxonium iodide 1 using trihexylborane as the initiator/catalyst in 50% NaOH aqueous solution/DCM mixture (Table 2, entry 1). The peak at 3.38 ppm on $^1$H NMR and the peak at 63.0 ppm on $^{13}$C NMR indicate the existence of C—O bonds in polymer 5.

Applicants also explored the effect of several reaction parameters on the reaction. Table 1-2, below, summarizes the polymerization results of trimethylsulfoxonium halides in 50% NaOH aqueous solution.

in DCM. This was established by evaluating the solubility of ylide 3 in different solvents under the polymerization conditions. The polymerization reaction was set up without adding initiator/catalyst B(hexyl)$_3$. Trimethylsulfoxonium iodide 1 was stirred in a mixture of 50% aqueous NaOH solution and organic solvent for 1 h. Then 1 mL of the organic solvent was removed from the mixture using a syringe filter and quenched in water. Dimethylsulfoxonium methylide 3 dissolved in the organic solvent would be converted to trimethylsulfoxonium hydroxide. After evaporating solvent and water, one calculates the solubility of ylide 3 in different solvents by measuring the amount of trimethylsulfoxonium hydroxide. It was found that DCM has better solubility for ylide 3 (0.145 mol/L) than THF (0.022 mol/L) and toluene (0.009 mol/L). There is a direct correspondence between the polymerization rate

TABLE 1-2

| entry | Salt | org. solv. | T (° C.) | time (h) | MW$_{th}$$^a$ (g/mol) | yield (%) | M$_n$ (g/mol) | M$_w$ (g/mol) | PDI | T$_c$ (° C.) | T$_m$ (° C.) | cryst (%) |
|---|---|---|---|---|---|---|---|---|---|---|---|---|
| 1 | Me$_3$SOI | DCM | 25 | 48 | 1,502 | 88 | 947 | 1,610 | 1.70 | 117 | 126 | 80 |
| 2 | Me$_3$SOI | DCM | 40 | 2 | 802 | 99 | 631 | 927 | 1.47 | 98$^b$ | 107$^b$ | 68 |
| 3 | Me$_3$SOI | DCM | 40 | 2 | 1,502 | 92 | 1,382 | 5,447 | 3.94 | 115 | 125 | 90 |
| 4 | Me$_3$SOI | DCM | 40 | 5 | 2,902 | 85 | 2,389 | 8,379 | 3.51 | 118 | 128 | 70 |
| 5 | Me$_3$SOI | DCM | 40 | 24 | 4,302 | 88 | 3,229 | 14,424 | 4.47 | 119 | 129 | 73 |
| 6 | Me$_3$SOI | DCM | 40 | 24 | 5,702 | 66 | 7,323 | 19,824 | 2.71 | 116 | 127 | 57 |
| 7 | Me$_3$SOCl | DCM | 25 | 48 | 1,502 | 65 | 1,529 | 2,337 | 1.53 | 113 | 123 | 78 |
| 8 | Me$_3$SI | DCM | 25 | 48 | 1,502 | 0 | — | — | — | — | — | — |
| 9 | Me$_3$SI | DCM | 50 | 48 | 1,502 | 0 | — | — | — | — | — | — |
| 10 | Me$_3$SOI | THF | 40 | 24 | 1,502 | 58 | 843 | 1,875 | 2.22 | — | — | — |
| 11 | Me$_3$SOI | tol | 40 | 24 | 1,502 | 24 | — | — | — | — | — | — |
| 12 | Me$_3$SOI | DCE | 40 | 2 | 1,502 | 74 | 1,393 | 5,438 | 3.90 | 116 | 125 | 66 |
| 13 | Me$_3$SOI | DCE | 75 | 24 | 5,702 | 24 | — | — | — | — | — | — |
| 14 | Me$_3$SOI | — | 25 | 48 | 1,502 | 8 | — | — | — | — | — | — |
| 15 | Me$_3$SOI | — | 25 | 120 | 1,502 | 78 | 1,403 | 6,766 | 4.82 | 117 | 127 | 52 |

$^a$MW$_{th}$ is calculated from the feed molar ratio of [1]/3[B(hexyl)$_3$].
$^b$The somewhat lower T$_m$ (107° C.) and T$_c$ (98° C.) can be attributed to the relatively low molecular weight of the polymer.

The polymerization is slow at room temperature, taking up to 48 h to completely consume the trimethylsulfoxonium iodide salt 1. However, the polymerization rate can be significantly accelerated by increasing the reaction temperature to 40° C. (Table 1-2, entries 1 and 3). A near quantitative yield of hydrocarbon polymer is obtained after 2 h at 40° C. Efforts to increase the reaction temperature further to 75° C. by switching to dichloroethane (DCE) resulted in the reaction mixture turning brown and a decline in polymer yield (Table 1-2, entries 6 and 13). This may be due to decomposition of trimethylsulfoxonium iodide at elevated temperatures, since switching the solvent from DCM to DCE has no noticeable effect on polymerization results under otherwise similar conditions (Table 1-2, entries 3 and 12).

Organic solvent plays an important role in the reaction. DCM results in faster polymerization (Table 1-2, entries 1, 14 and 15). When no organic solvent is added to the system, the polymerization slows down significantly. Reasonable yield required 120 h. As was mentioned previously, DCE affords polymethylene 5 in comparable yield and rate to DCM (Table 1-2, entries 3 and 12). The polymerization rate decreases significantly when using tetrahydrofuran (THF) or toluene as the organic solvent (Table 1-2, entries 3, 10 and 11). DCM affords polymethylene 5 with 92% yield in 2 h. However, polymer was produced in lower yield (58% for THF, and 24% for toluene) even after a prolonged reaction time (24 h). Trimethylsulfoxonium iodide 1 has low solubility in all the above-mentioned solvents and in 50% NaOH. This rate dependence on solvent can be explained by the higher solubility of active monomer dimethylsulfoxonium methylide 3 and the organic solvent. The rate decreases with changing the solvent from DCM to THF, to toluene.

The trimethylsulfoxonium cation serves as the monomer precursor, the counterion was found to have no observable effect on the polymerization since trimethylsulfoxonium chloride (Me$_3$SOCl) also affords polymethylene 2 in comparable yield and rate (Table 1-2, entries 1 and 7). However, the trimethylsulfonium cation cannot be utilized as the carbon source, since it was found trimethylsulfonium iodide (Me$_3$SI) does not produce polymer at either room temperature or 50° C. (Table 1-2, entry 8 and 9). It was shown that dimethylsulfonium methylide can be generated in-situ and undergo cycloaddition with benzaldehyde to produce 2-phenyloxirane under similar conditions. In our case, dimethylsulfonium methylide is probably generated, but it does not polymerize with organoborane initiator/catalyst. The reason for this is not at present known. Scheme 1-5, below, shows cycloaddition of benzaldehyde by in-situ generated dimethylsulfonium methylide.

Scheme 1-5

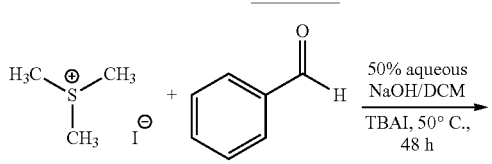

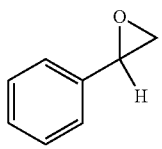

Despite the reaction heterogeneity, GPC analysis of the polymer establishes that this reaction provides a degree of molecular weight control. Increasing the feed ratio of monomer precursor (trimethylsulfoxonium iodide 1) to initiator/catalyst (B(hexyl)$_3$), results in an increase of the observed molecular weight (Table 2, entries 2-6). Hydrocarbon polymers with molecular weights from 600 to 7,000 g/mol are readily obtained under these conditions. Higher molecular weight material can be obtained by extending the reaction time at 40° C. (Table 2, entries 2-6).

Other reaction parameters were also investigated for the polyhomologation of trimethylsulfoxonium iodide 1 in aqueous NaOH/DCM mixtures. Table 1-3, below, summarizes the polymerization results of trimethylsulfoxonium iodide 1 in 50% NaOH aqueous/DCM mixture.

TABLE 1-3

| entry | base | surfactant | T (° C.) | yield (%) | $M_n$ (g/mol) | $M_w$ (g/mol) | PDI | $T_c$ (° C.) | $T_m$ (° C.) | cryst (%) |
|---|---|---|---|---|---|---|---|---|---|---|
| 1 | 50% NaOH | TBAI | 25 | 88 | 947 | 1,610 | 1.70 | 117 | 126 | 80 |
| 2 | 30% NaOH | TBAI | 25 | 32 | 2,046 | 2,893 | 1.41 | 114 | 124 | 73 |
| 3 | 30% NaOH | TBAI | 40 | 37 | 808 | 4,654 | 5.76 | 73, 112[b] | 79, 122[b] | 16, 30[b] |
| 4 | 40% Bu$_4$NOH | TBAI | 25 | 0 | — | — | — | — | — | — |
| 5 | 50% NaOH | — | 25 | 65 | 1,278 | 2,861 | 2.24 | 117 | 125 | 77 |
| 6 | 50% NaOH | SDS | 25 | 83 | 1,230 | 2,592 | 2.11 | 116 | 125 | 83 |
| 7 | 50% NaOH | NP-9 | 25 | 0 | — | — | — | — | — | — |

[a]Trimethylsulfoxnium iodide 1, trihexylborane, and 2 mL of DCM are used for all the reactions. All the reactions run for 48 h. MW$_{th}$ = 1,502 g/mol.
[b]This sample has two $T_m$ (79, 122° C.) and two $T_c$ (73, 112° C.). The lower $T_m$ and $T_c$ can be attributed to the relatively low molecular weight polymer portion of this sample.

As seen in Table 1-3, the polymer yield decreases to 32% with 30% NaOH solution ([OH$^-$]=9M), and no polymer was produced with 40% Bu$_4$NOH aqueous solution ([OH$^-$]= 1.5M) (Table 1-3, entries 1-4). Increasing the reaction temperature to 40° C. does not help. Base concentration is more important here than the polymerization with methylide 3 in NaOH aqueous solution/toluene mixture, since 10% NaOH is sufficient for polymer production from the polymerization with methylide 3 (Table 2-1, entry 9). It is believed that the polymerization of trimethylsulfoxonium iodide 1 starts with mm-sized crystals of salt 1, which do not dissolve in DCM. They have very limited solubility in NaOH solution and may react with NaOH aqueous solution at the solid-liquid interface. The particle size may have an influence on reaction rate. A high concentration of base is needed to produce a supply of active monomer methylide 3 for polymer production. This active monomer must diffuse into the DCM layer to initiate polymerization.

Surfactant is not necessary for the reaction (Table 1-3, entries 1, 5-7). Active monomer 3 is a zwitterionic compound, which has both positive and negative charges in the molecule, so it can transfer freely between organic phase and aqueous phase by itself. Even when no surfactant is added, the polymerization goes well. Interestingly, it is shown that neutral surfactant NP-9 prohibited the polymerization, but neither positively charged surfactant tetrabutylammonium iodide (TBAI) nor negatively charged surfactant SDS has an effect on the polymerization.

SEM was again utilized to examine the morphology of polymethylene 5 produced from the polymerization of trimethylsulfoxonium iodide 1 in aqueous 50% NaOH solution/DCM mixture. Specifically, Applicants obtained an SEM image of polymethylene 5 prepared from the polymerization of trimethylsulfoxonium iodide 1 in 50% NaOH aqueous solution using DCM as the organic solvent (Table 1-2, entry 1) as well as an SEM image of an individual disk-like particle. The polymer particles were seen to have a disk-like shape with an average pseudodiameter of 650 nm. There were no flower-like particles. The absence of flower-like particles may be due to less entanglement between polymer chains by using DCM, since DCM is a poor swelling solvent compared to toluene for polymethylene.

The X-ray diffraction (XRD) pattern of polymer 5 shows two main intensities at d-spacings of 4.15 and 3.74 Å, which match the characteristic 110 and 200 reflections for the orthorhombic unit cell of high-density polyethylene (HDPE; FIG. 2-9). This result confirms the semicrystalline characteristic of polymer 5 and further indicates that polymer 5 has few, if any, branches along the backbone, a finding that is confirmed by the NMR spectra of polymer 5 (FIGS. 6A and 6B).

Figure 7:
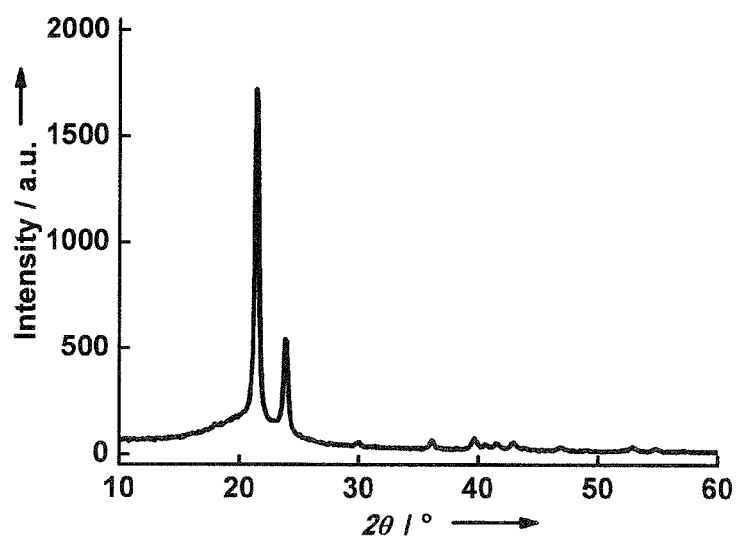
FIG. 7 shows an XRD spectrum of polymethylene 5 produced from trimethylsulfoxonium iodide 1 using trihexylborane as the initiator/catalyst in 50% NaOH aqueous solution/DCM mixture as described in Example 1 below.

FIG. 7 shows an XRD spectrum of polymethylene 5 produced from trimethylsulfoxonium iodide 1 using trihexylborane as the initiator/catalyst in 50% NaOH aqueous solution/DCM mixture (Table 1-2, entry 1). Also, the thermal behavior and crystallinity of polymethylene 5 were analyzed by DSC. The as-synthesized polymethylene 5 exhibits a $T_m$ in the range of 122-129° C. and a $T_c$ in the range of 112-119° C., values that are similar to those of PE waxes with comparable molecular weight. Polymer 5 has a crystallinity range of 46-90%, which is typical for linear PE waxes with low branch content.

Figure 8A:
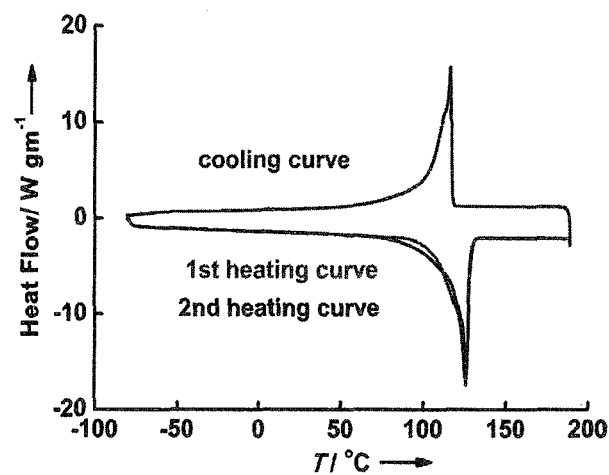
FIG. 8A shows DSC traces of polymethylene 5 produced from trimethylsulfoxonium iodide 1 using trihexylborane as the initiator/catalyst in 50% NaOH aqueous solution/DCM mixture per Table 2, entry 1.
Figure 8B:
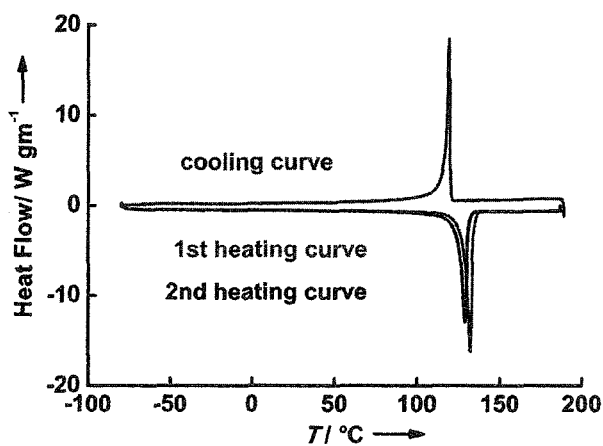
FIG. 8B shows DSC traces of polymethylene 5 produced from trimethylsulfoxonium iodide 1 using trihexylborane as the initiator/catalyst in 50% NaOH aqueous solution/DCM mixture per Table 2, entry 5.

FIGS. 8A and 8B show DSC traces of polymethylene 5 produced from trimethylsulfoxonium iodide 1 using trihexylborane as the initiator/catalyst in 50% NaOH aqueous solution/DCM mixture per Table 1-2, entry 1 (FIG. 8A) and per Table 2, entry 5 (FIG. 8B).

Mechanistic Study of the Polymerization of Trimethylsulfoxonium Iodide 1 in Aqueous NaOH The proposed mechanism of the polymerization draws from earlier studies of the traditional polyhomologation reaction of dimethylsulfoxonium methylide 3 in anhydrous solvent at elevated temperature. Shown below are Schemes 1-6A, 1-6B and 1-6C. Scheme 1-6A is a general mechanism of the polyhomologation reaction, Scheme 1-6B shows equilibrium for monomer production and Scheme 1-6C shows equilibrium for initiator/catalyst production.

Scheme 1-6A
General Mechanism for the Polyhomologation Reaction

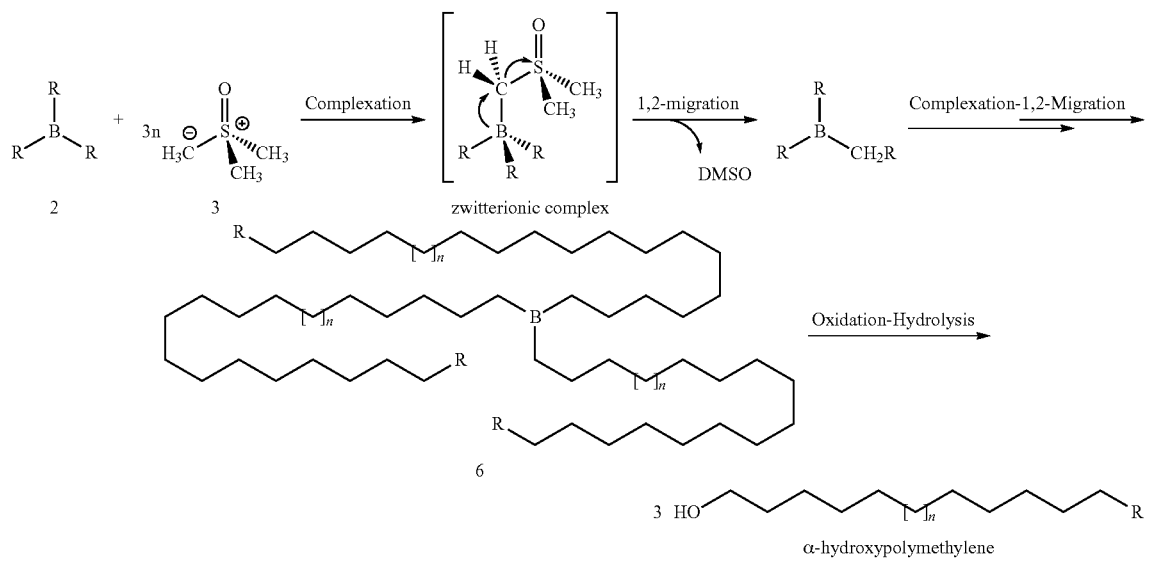

Scheme 1-6B
Monomer Production

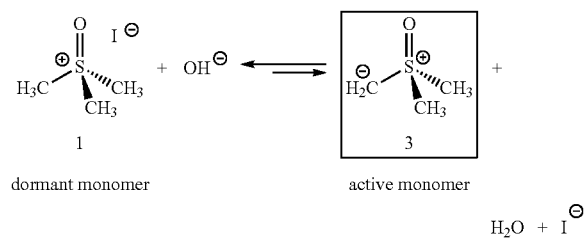

Scheme 1-6C
Initiator Production

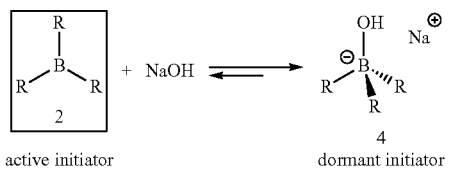

The formation of polymethylene in aqueous solution requires multiple methylene insertions at the organoboron centers. Carbon chain extension must involve formation of a zwitterionic "ate" complex between a trialkylborane and ylide 3 (Scheme 6a). A 1,2-migration extends the chain by one carbon at a time and regenerates the Lewis acidic trialkylborane. The fact that the reaction occurs with facility in aqueous solution is somewhat unexpected.

Figure 9A:
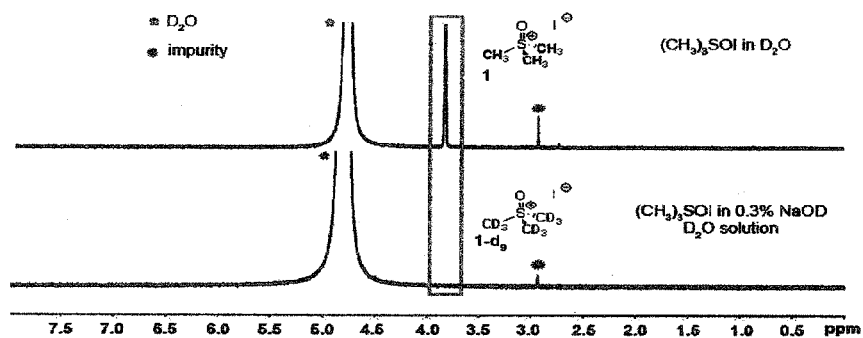
FIG. 9A shows $^1$H NMR spectra of trimethylsulfoxonium iodide 1 in $D_2O$ (top) and trimethylsulfoxonium iodide 1 in 0.3% NaOD $D_2O$ solution (bottom) as described in Example 1 below.
Figure 9B:
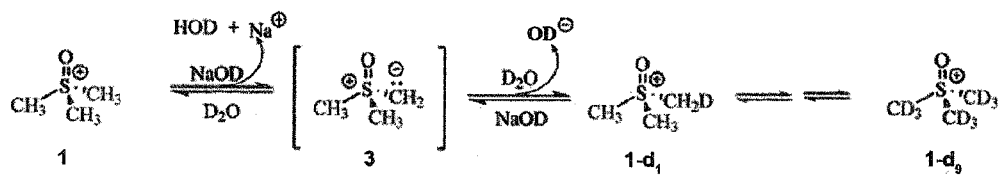
FIG. 9B shows a schematic diagram of the deuterium-proton exchange between trimethylsulfoxonium iodide 1 and its deuterium form 1-$d_9$ as described in Example 1 below.

Dimethylsulfoxonium methylide 3 is believed to be the active monomer in the aqueous polymerization. Its formation under these conditions is supported by the observation that despite the higher pKa of trimethylsulfoxonium iodide 1 (~18) compared to water, exposure of 1 to NaOD/D$_2$O results in rapid deuterium exchange of all protons within 10 min at room temperature. FIG. 9A shows $^1$H NMR spectra of trimethylsulfoxonium iodide 1 in D$_2$O (top) and trimethylsulfoxonium iodide 1 in 0.3% NaOD D$_2$O solution (bottom). Both spectra are recorded immediately (<5 min) after the samples are prepared. The disappearance of the peak at 3.85 ppm (bottom) indicates that trimethylsulfoxonium iodide 1 is rapidly converted to its deuterium form 1-d$_9$ in 0.3% NaOD D$_2$O solution. FIG. 9B shows a schematic diagram of the deuterium-proton exchange between trimethylsulfoxonium iodide 1 and its deuterium form 1-d$_9$. Dimethylsulfoxonium methylide 3 is the intermediate in this exchange reaction. Although salt 1 has low solubility in both DCM and 50% NaOH, the heterogeneous suspension functions as a monomer reservoir and the rapid (but unfavorable) equilibrium between the dormant monomer 1 and the active monomer 3 is established in aqueous base creating a low but steady-state concentration of 3 (Scheme 6B). Complexation between methylide 3 and trialkylborane 2 is necessary for polymer production (Scheme 6A). However, in 50% NaOH, hydroxide ion competes with methylide 3 by complexing with active initiator/catalyst, organoborane 2, resulting in the formation of a tetra-coordinated borate complex 4 (Scheme 6C). This saturated complex 4 is a dormant initiator/catalyst. However, hydroxide complexation must be reversible under the reaction conditions. Decomplexation allows for a productive encounter with ylide 3 followed by 1,2-alkyl migration, the essential step in the polymerization. The reversible hydroxide complexation results in all trialkylborane species having equal probability to propagate, which provides a degree of molecular weight control.

Figure 10A:
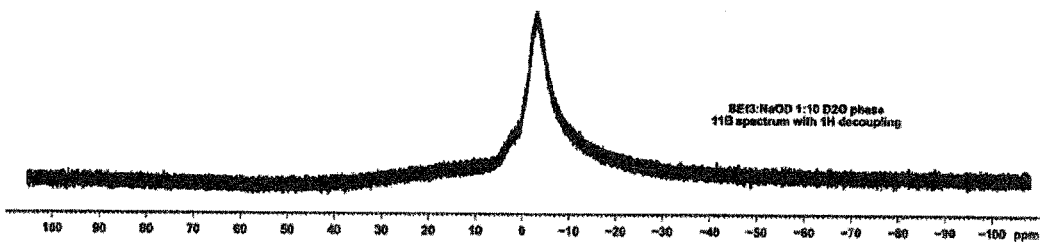
FIG. 10A is a 11BNMR spectrum of D2O phase of Model Compound Et3B and NaOD mixture.
Figure 10B:
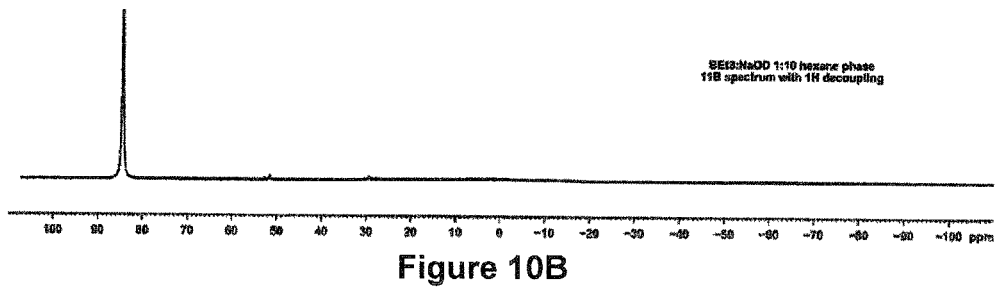
FIG. 10B is a 11BNMR spectrum of hexane phase of Model Compound Et3B and NaOD mixture.
Figure 10C:
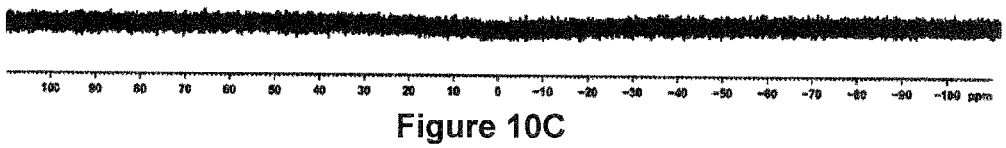
FIG. 10C is a 11BNMR spectrum of (c) D2O phase of B(hexyl)3 and NaOD mixture.

Despite the heterogeneity of the polymerization, initiation is believed to mainly occur in the organic phase. Organic solvent DCM plays an important role at the initial stage of the polymerization. Besides having good solubility of dimethylsulfoxonium methylide 3, DCM also prevents the precipitation of B(hexyl)$_3$ and facilitates efficient initiation. Treatment of neat B(hexyl)$_3$ with 50% NaOH solution leads to the precipitation of white crystalline compound Na$^+$ [(hexyl)$_3$BOH]$^-$, the dormant initiator/catalyst. Adding DCM to the mixture results in the disappearance of the white solid, which may arises from the dissociation of the borate complex and dissolution of B(hexyl)$_3$ into DCM. Existence of trialkylborane in the organic phase is also confirmed by the $^{11}$BNMR studies of model compound Et$_3$B as shown in FIGS. 10A through 10C. FIG. 10A is a $^{11}$BNMR spectrum of D$_2$O phase of Et$_3$B and NaOD mixture. FIG. 10B is a $^{11}$BNMR spectrum of hexane phase of Et$_3$B and NaOD mixture. FIG. 10C is a $^{11}$BNMR spectrum of (c) D$_2$O phase of B(hexyl)$_3$ and NaOD mixture. The solution of Et$_3$B in hexane was mixed with excess NaOD/D$_2$O solution. After stirring for 10 min, the solution was allowed to settle and $^{11}$B NMR was obtained for the hexane and aqueous phases. (FIGS. 10A and 10B) These results show that Et$_3$B mainly exists in the organic phase, there is no significant signal of Et$_3$B appearing on the spectrum of the aqueous solution. Once the complex Na$^+$[Et$_3$BOH]$^-$ is formed at the inter-phase, it would be transferred into the aqueous phase. Little adduct Na$^+$[Et$_3$BOH]$^-$ is detected in the organic phase. When the alkyl chain gets longer, the organoboron species become more hydrophobic and no organoboron species can be found in the NaOH aqueous phase. No boron signal is detected in the aqueous phase upon adding NaOD/D$_2$O solution to neat B(hexyl)$_3$ (FIG. 10C). It is clear that trialkylborane, the active initiator/catalyst 2, exists in the organic phase at the initial stage of polymerization and initiation mainly occurs in the organic phase.

Once the polymer chain reaches a certain length (~30 carbons), polymethylene is no longer soluble in DCM. A polymer solid phase forms and the remaining polymerization takes place in the growing active polymethylene particles. The reaction terminates when the trimethylsulfoxonium iodide 1 is consumed, and/or at high molecular weight, all catalyst/initiator sites are no longer accessible. The diminished accessibility arises from the reaction heterogeneity as polymethylene chains crystallize to form disk-like particles.

The diminished accessibility can also explain in part the observed PDI erosion at higher molecular weight. As the calculated molecular weight increases, the observed PDI increases and the polymerization rate decreases somewhat under the same reaction condition (Table 1-2, entries 2-6). As polymer chains get longer, the propagating boron centers are more confined within polymethylene particles (FIG. 4). Semicrystalline polymethylene has crystalline domains and amorphous domains. Since the organoborane centers always function as branch points for the polymer chains, they tend to exist in the amorphous phase. Some organoborane centers are located far away from the lamellae, where the polymer chains around them are more mobile, so it is easier for ylide 3 to access. Some organoborane centers are located close to the lamellae or even buried at the surface of lamellae, where the polymer chains are well packed into an ordered lattice arrangement. These organoborane propagating sites do not have much mobility, and may have less access to ylide 3. Therefore, these organoborane sites may appear as "dead" and they don't propagate to grow longer polymer chains. As the polymerization proceeds, more and more organoborane sites "die". As a result, the PDIs increase from what would be expected for a homogeneous single site catalyst and the polymerization rate decreases. Nevertheless, the reaction proceeds rapidly with reasonable molecular weight control over the molecular weight range of 600-7,000 g/mol.

Figure 11:
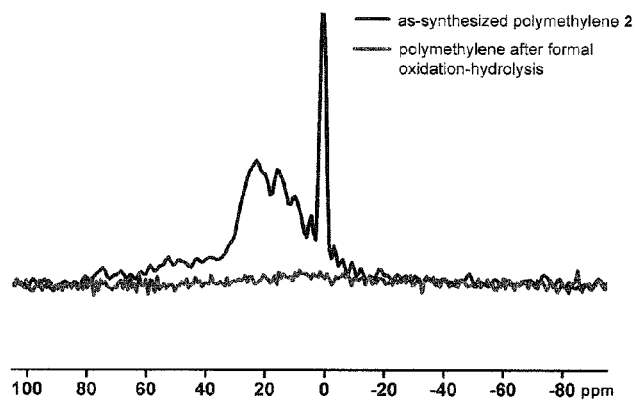
FIG. 11 shows a solid state $^{11}$B NMR spectra of as-synthesized polymethylene 5 (black) produced from trimethylsulfoxonium iodide 1 using trihexylborane as the initiator/catalyst in 50% NaOH aqueous solution/DCM mixture (Table 1-1, entry 1) as described in Example 1 below.

The kinetic product is a polyhomologated trialkylborane 6 (Scheme 1-6a). Following consumption of the salt, the reaction is exposed to the atmosphere during isolation of the product. During this time, organoborane 6 may be partially oxidized and hydrolyzed in basic aqueous solution to a mixture of boronic and boric acids/esters, and their hydroxy complexes. Although no formal oxidation-hydrolysis step was carried out after the polyhomologation reaction, the oxidation-hydrolysis was confirmed by both IR and NMR spectra, which indicate the existence of oxygen-carbon bonds and hydroxy groups in polymer 5. Solid state $^{11}$B NMR spectrum of polymer 5 also shows the characteristic signals for boronic and boric acids/esters, and their hydroxy complexes. The air oxidation of organoboranes is well-known. Furthermore, semicrystalline PE has good O$_2$ permeability, which would facilitate air oxidation of the solid, boron-containing polymer. A model reaction with tridecylborane confirmed the spontaneous oxidation and hydrolysis. After stirring a DCM solution of tridecylborane with 50% NaOH solution in air, 80% of decanol was obtained. However, because the polymerization workup does not involve an exhaustive oxidation-hydrolysis, polymethylene 5 contains polymethylene boronic and boric acids/esters/complexes. These species can contribute to the relatively broad molecular weight distributions. If the as-synthesized polymethylene 5 is subjected to a formal oxidation-hydrolysis with trimethylamine N-oxide dihydrate in toluene at 80° C., all the boron species are fully oxidized and hydrolyzed. The resultant polymethylene product exhibits no boron signal on solid state $^{11}$B NMR spectrum, as shown in FIG. 11. Specifically, FIG. 11 shows a solid state $^{11}$B NMR spectra of as-synthesized polymethylene 5 (black) produced from trimethylsulfoxonium iodide 1 using trihexylborane as the initiator/catalyst in 50% NaOH aqueous solution/DCM mixture (Table 1-1, entry 1), and polymethylene (blue) produced after a formal oxidation-hydrolysis of polymethylene 5 with trimethylamine N-oxide dihydrate in toluene at 80° C. Trialkylboranes BR$_3$ are typically in the range of 80-90 ppm, borinic acids/esters are in the range of 40-60 ppm, boronic acids/esters are in the range of 25-40 ppm, boric acids/esters are in the range of 10-25 ppm, tetracoordinated boron complexes are in the range of −10 to 10 ppm.

Development of a Robust Polymerization of Trimethylsulfoxonium Iodide 1 in Aqueous NaOH Under an Atmosphere of Air The polyhomologation reaction can now be run in water. Both trimethylsulfoxonium iodide 1 and dimethylsulfoxonium methylide 3 are stable in air, since the cyclopropanation of E-chalcone can be carried out under air in good yield. The following Scheme 1-7 shows Cyclopropanation of E-chalcone by in-situ generated dimethylsulfoxonium methylide 3.

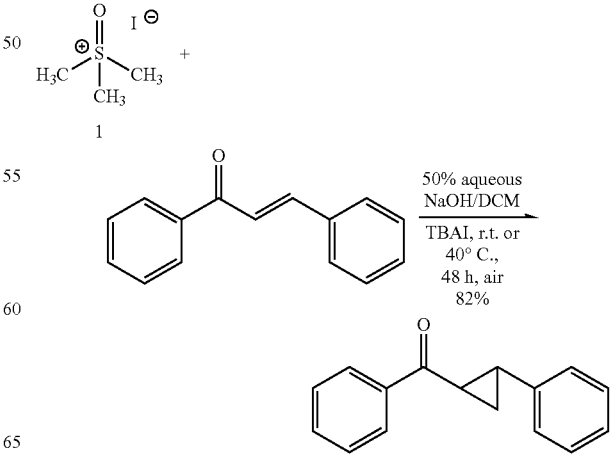

Scheme 1-7

It is only the sensitivity of trialkylborane that restricts the polymerization to be carried out under the protection of a $N_2$ atmosphere. It is desirable if we can develop an air-stable initiator/catalyst. If successful, the polyhomologation reaction would be very robust.

The trialkylborane initiator/catalyst is oxygen-sensitive. Once oxidized, it will lose its catalytic activity. Scheme 1-8, below, shows attempted $Et_2BOMe$-initiated/catalyzed polymerization of trimethylsulfoxonium iodide 1 in 50% NaOH aqueous solution/DCM mixture.

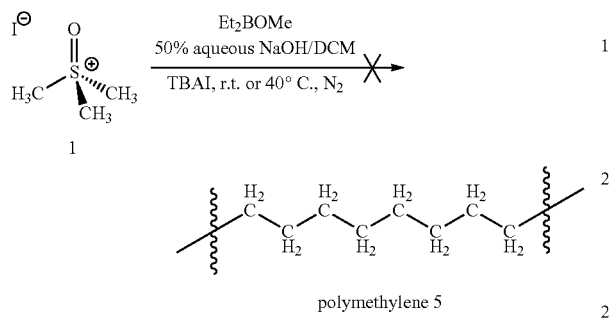

When borinic ester diethylmethoxyborane was used as initiator/catalyse, no polymethylene was obtained from the aqueous polyhomologation of trimethylsulfoxonium iodide at either room temperature or 40° C. after 48 h, as seen in Scheme 8. This is due to the higher activation energy for 1,2-migration step of borinic ester.ylide zwitterionic complexes.

Compared to trialkylborane, triphenylborane ($BPh_3$) 7 has better stability in air, with a half-life of 65 h in air. Moreover, triphenylborane has been successfully utilized as initiator/catalyst for the traditional polyhomologation reaction of dimethylsulfoxonium methylide 3 in toluene at 80° C. Therefore, the aqueous polyhomologation reaction of trimethylsulfoxonium iodide 1 was attempted with triphenylborane 7 as catalyst/intiator in 50% NaOH aqueous solution/DCM mixture, as shown in Scheme 1-9 below:

Scheme 1-9

No polymer was obtained from the reaction at either room temperature or 40° C. The failure of the polymerization is proposed to be a result of high stability of $BPh_3$.NaOH complex. The dissociation of $BPh_3$.NaOH adduct in aqueous solution requires a near neutral pH (pH<7). Additionally, the instability of triphenylborane 7 in aqueous solution also contributes to the failure of polymer production. Triphenylborane 7 is highly insoluble in water, and can be hydrolyzed by water to form a mixture of phenylboric oxide and phenylboronic acid.

Trimesitylborane may be used as an alternative to triphenylborane 7. Trimesitylborane (TMB) is reported to be remarkably stable in air for as long as fifteen months. It does not complex with hydroxide ion to form TMB.NaOH complex, and dilute NaOH solution has no observable effect on trimesitylborane in a period of four days. The stability of trimesitylborane is due to the steric shielding effect of the boron center by the surrounding mesityl groups. It has also shown that the mesityl group has a nearly equal migratory aptitude as n-alkyl groups.

Scheme 1-10, below, shows a traditional polyhomologation reaction of dimethylsulfoxonium methylide 3 initiated/catalyzed by dimethylmesitylboran 8.

Scheme 1-10

This traditional polyhomologation of ylide 3 with initiator/catalyst dimethylmesitylborane 8 in toluene at 48° C. afforded a mixture of mesityl-terminated alcohol 9 and methyl-terminated alcohol 10 in the ratio of 1:2.4 (73% yield, Scheme 2-10). However, the catalytic activity of trimesitylborane for the polyhomologation reaction needs to be testified in the future.

In conclusion, this example demonstrates an aqueous phase reaction for the production of polymethylene from a C1 carbon source at or near r.t. under atmospheric pressure. Because the carbon source is methyl halide, a C1 molecule that can be derived from more abundant carbon sources, this polymerization establishes an alternative link between non-petroleum carbon sources and one of the most important hydrocarbon materials. The C1 carrier in the reaction, dimethylsulfoxide (DMSO) is not consumed in the reaction. The reaction is catalyzed/initiated by trialkylboranes, readily available nonmetallic Lewis acids that are stable in water.

Example 2

Controlled Synthesis of Functionalized Polymethylene from Aqueous Polyhomoloqation Polyethylene (PE) is the most important synthetic polymer. It is widely used in all aspects of modern human life. However, some inherent drawbacks of PE, such as poor adhesion, toughness and compatibility with other materials, prevent it from broader applications. One way to solve this problem is to modify PE with various functional groups. For example, linear PE modified with short chain alkyl branches can improve toughness, transferring the polymer from a hard plastic to a flexible film. Therefore, high-density polyethylene, the polymer with low branch content, is used for milk bottles, and linear low-density polyethylene, the polymer modified with shot chain branches, is used for shopping bags.

Since the commercialization of PE in the 1950s, the functionalization of PE has attracted considerable interest from both academia and industry. Many approaches have been developed to incorporate functional groups into PE (Scheme 3-1). Ultraviolet irradiation of preformed PE in air, a postpolymerization method, is the simplest way to introduce of oxygen-containing functional groups onto polymer chains. However, besides the harsh reaction conditions, it suffers from low incorporation of functional groups (1-2 mol %), and polymer degradation and/or crosslinking. Ring-opening metathesis polymerization (ROMP) of functionalized cycloalkenes followed by hydrogenation provides an alternative access to functionalized polyethylene. In a similar way, symmetrically substituted α, dienes can be polymerized by acyclic diene metathesis (ADMET) polymerization and subsequently hydrogenated to afford model PE samples with various substituents at precise intervals along the polymer backbone. Due to the structural requirement for polymerizable monomers, the incorporation ratio of functional groups is limited <5 mol % for ADMET and <25 mol % for ROMP. The traditional method for industry application is the direct copolymerization of ethylene and functionalized olefins catalyzed by radical or transition-metal catalysts. Despite their high efficiency for non-polar functional groups, they have limited application for polar substituents. Radical polymerization produces functionalized PE containing 25-50 mol % polar substituents, while transition-metal-catalyzed polymerization affords PE with <6% of polar substituents.

Scheme 2-1 below shows various approaches for functionalized PE.

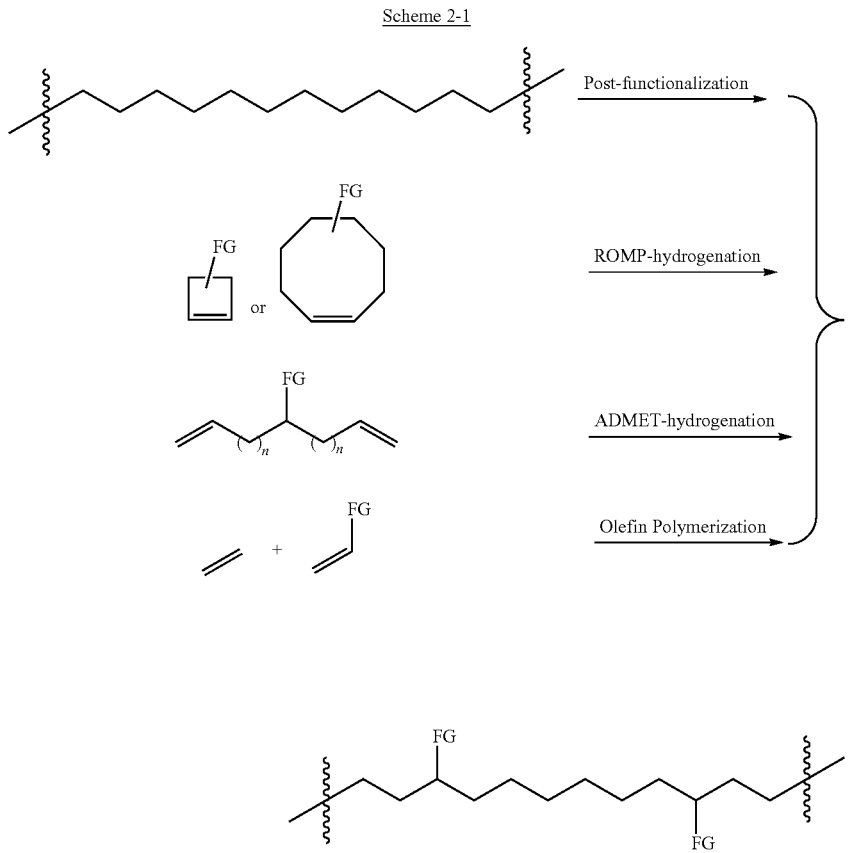

Scheme 2-1

Applicants have also developed methods for the synthesis of functionalized PE. In previous work, Applicants found that (dimethylamino)arylsulfoxonium ylide 1 and diazocompounds 2 can be successfully copolymerized with dimethylsulfoxonium methylide 3 to afford substituted polymethylene using the traditional polyhomologation reaction under anhydrous condition at elevated temperature (Scheme 3-2). In this chemistry, the polymer backbone is constructed one carbon at a time from —CH$_2$— and —CH(FG)-fragments. The polyhomologation reaction can precisely control the molecular weight, PDI, and composition of the polymer.

Scheme 2-2, below, shows random copolymerization of substituted (dimethylamino) arylsulfoxonium ylide 1 or substituted diazomethane 2 with dimethylsulfoxomium methylide 3 in the traditional polyhomologation reaction.

Scheme 2-2
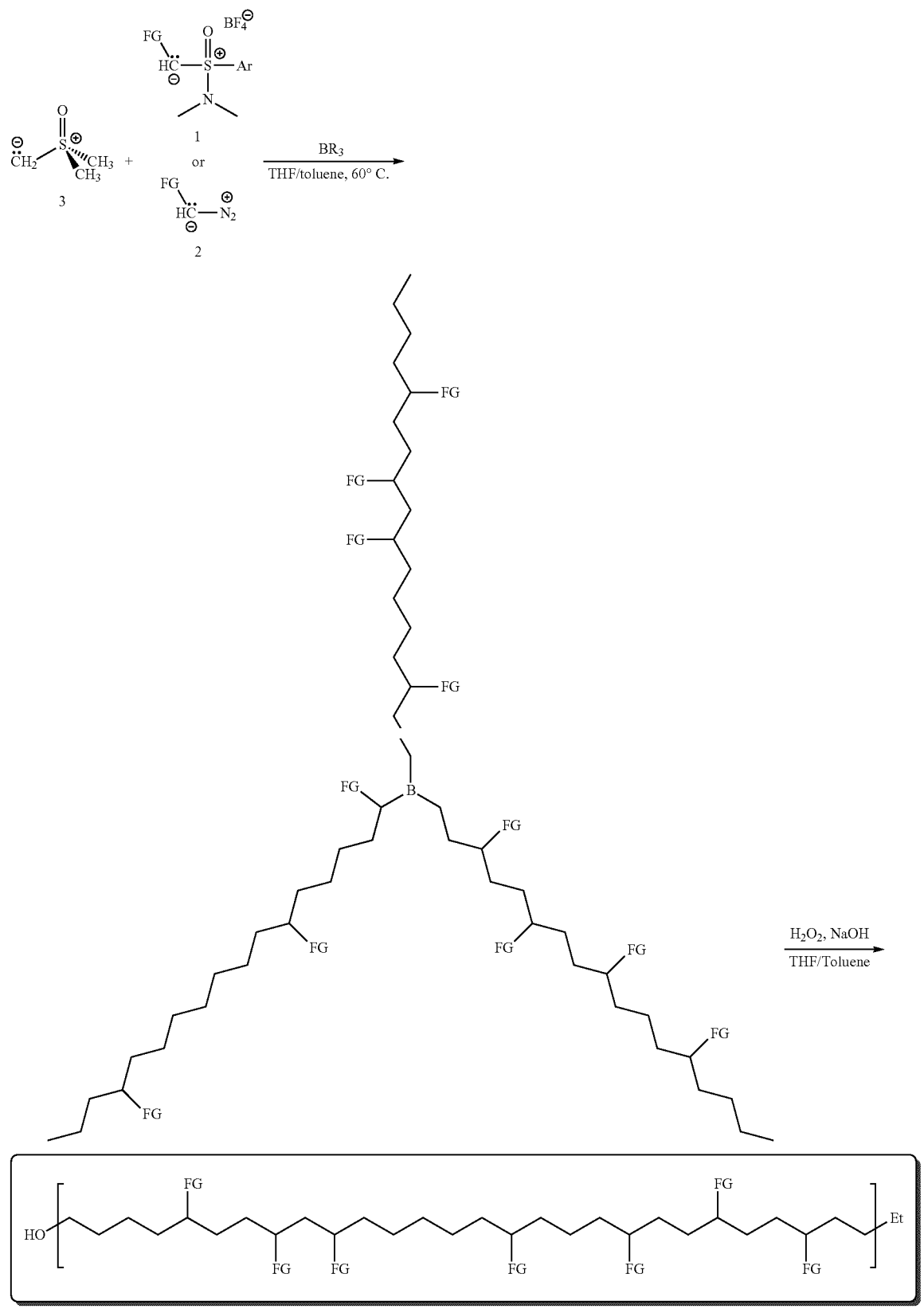

However, only a limited number of substituents, such as methyl, cyclopropyl, trimethylsilyl and ethoxycarbonyl, were incorporated into the resultant polymethylene. This limitation arises from the instability of secondary ylides 1 or diazocompounds 2. In the traditional polyhomologation reaction, ylides or diazocompounds are prepared and stored before polymerization. Many secondary ylides 1 suffer from decomposition during the polyhomologation reaction at elevated temperature, and some diazocompounds 2 are explosive even at room temperature. For example, benzyldiazomethane has to be stored at −80° C., (dimethylamino)phenylsulfoxonium chloromethylide quickly decomposes at room temperature, and (dimethylamino)tolylsulfoxonium cyclopropylide has a half-life of approximately 4 days.

In order to overcome this problem, milder conditions had to be developed for the polyhomologation reaction. It would be desirable if the ylide monomer could be generated in-situ during the polymerization. Example 1 above describes a new aqueous $BR_3$ polyhomologation starting with the salt trimethylsulfoxonium iodide 4 in 50% NaOH solution. Perfectly linear polymethylene was obtained from the polymerization at/near room temperature. During the reaction, trimethylsulfoxonium iodide 4 functions as a monomer reservoir. It can be deprotonated by sodium hydroxide to produce the active monomer dimethylsulfoxonium methylide 3 in-situ. Monomer 3 can then undergo the polyhomologation reaction with trialkylborane, a water-stable catalyst/initiator. Despite the novelty of this polymerization, the reaction was limited to the synthesis of linear polymethylene.

In this example, Applicants extend the aqueous polyhomologation reaction to the synthesis of functionalized polymethylene by using substituted monomer precursors. The following Scheme 2-3 shows random copolymerization of Substituted alkyl(dimethylamino)phenylsulfoxonium tetrafluoroborates 5 with trimethylsulfoxonium iodide 4 in the aqueous polyhomologation reaction.

have a branch content range of 9-21 mol % and contains new contiguous branch patterns.

Methyl-Substituted Linear Polymethylene

For the synthesis of a substituted carbon chain in this example, Applicants were particularly interested in ethyl (dimethylamino)phenylsulfoxonium tetrafluoroborate 6, a ylide precursor that serves as a source of the ethylidene group (—$CHCH_3$—). Compound 6 is used to test the compatibility of alkyl(dimethylamino)phenylsulfoxonium tetrafluoroborate family of secondary ylides precursors 5 with the aqueous polyhomologation reaction. Its ylide (dimethylamino)phenylsulfoxonium ethylide 7 was shown to be polymerizable with trialkylborane in toluene/THF at elevated temperature. The question is whether the active ylide 7 can be generated in-situ at/near room temperature in aqueous base. The generation and polymerization rate of 7 also needs to parallel the unsubstituted ylide 3 under this condition. The successful aqueous copolymerization of the alkyl(dimethylamino)phenylsulfoxonium tetrafluoroborate family 5 with trimethylsulfoxonium iodide 4 can provide a novel entry into substituted carbon backbone polymers with variations on the alkyl group of 5.

Figure 12:
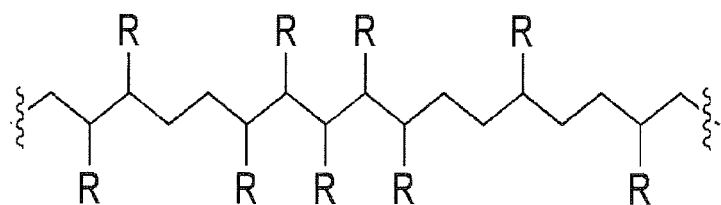
FIG. 12 shows the structure of a branched polymethylene having a new contiguous substituent pattern as described in Example 2 below.

Since the polyhomologation reaction builds the polymethylene one carbon at a time, it provides an opportunity to synthesize contiguous substituent pattern from substituted C1 building blocks, as shown in FIG. 12. This new pattern is not easily prepared from other polymerization methods. A new polymer microstructure is usually identified from comparison with similar structures in the literature. Due to the commercial importance of PE, the microstructure of methyl-substituted alkane model compounds and various PE copolymers, as a source of information for polymer configurational distributions, comonomer sequence distributions, average sequence lengths, structure and distribution of short chain branches, has been extensively investigated and well docu-

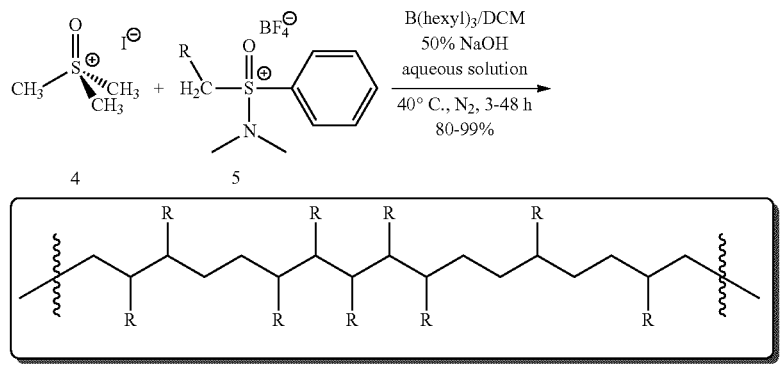

Scheme 2-3

The "R" in Scheme 2-3 R can be very broadly defined including + and/or − charged groups. Substituted alkyl(dimethylamino)phenylsulfoxonium tetrafluoroborates 5 can be deprotonated in aqueous base to produce substituted ylide 1 in-situ, which can then be copolymerized with trimethylsulfoxonium iodide 4 by trialkylborane initiator/catalyst. The in-situ generation of ylide and the mild (low temperature) aqueous polymerization conditions have the potential to introduce many functional groups in the polymer. The polymer is built up one carbon at a time from —$CH_2$— and —CHR— fragments. In addition, the resultant polymer may mented by many polymer scientists. Therefore, methyl-substituted linear polymethylene prepared from ethyl (dimethylamino)phenylsulfoxonium tetrafluoroborate 6, serves as an great platform to study the substituent pattern of polymethylene. For the above-mentioned reasons, the aqueous copolymerization of ethyl (dimethylamino)phenylsulfoxonium tetrafluoroborate 6 with trimethylsulfoxonium iodide 4 was examined.

The synthesis of ethyl (dimethylamino)phenylsulfoxonium tetrafluoroborate is outlined in the following Scheme 2-4.

Scheme 2-4

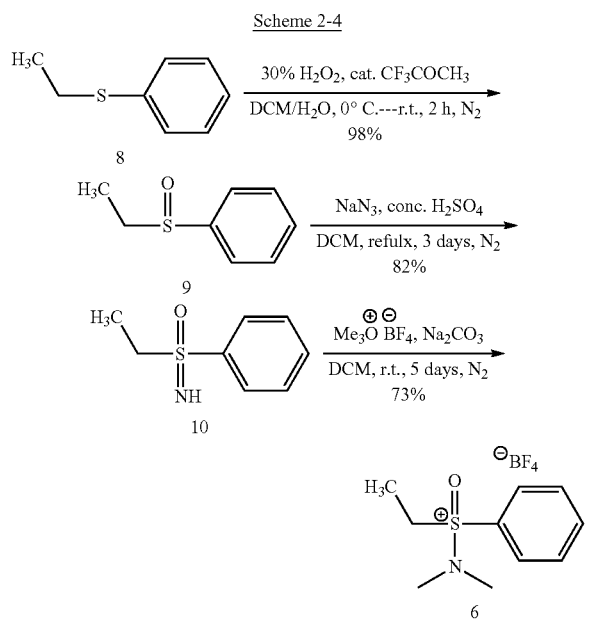

This synthesis of ethyl (dimethylamino)phenylsulfoxonium tetrafluoroborate 6 starts with commercially available ethyl phenyl sulfide 8. Sulfide 8 was oxidized by hydrogen peroxide to the corresponding sulfoxide 9 using a catalytic amount of trifluoroacetone. The subsequent imination of sulfoxide 9 with sodium azide in concentrated sulfuric acid gave sulfoximine 10. Alkylation of free sulfoximine 10 to ethyl (dimethylamino)phenylsulfoxonium tetrafluoroborate 6 can be accomplished by employing a large excess of trimethyloxonium tetrafluoroborate. The crude salt of 6 was recrystallized in isopropanol and dried under high vacuum to yield the white crystalline solid 6.

Figure 13:
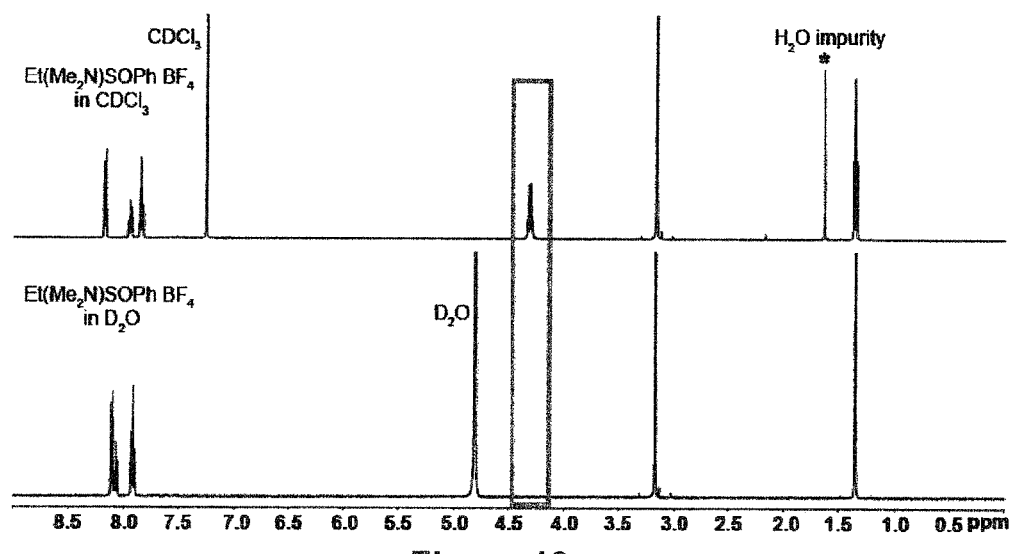
FIG. 13 shows a comparison of H-D exchange of ethyl (dimethylamino)phenylsulfoxonium tetrafluoroborate by $D_2O$ $^1$H NMR spectra in $CDCl_3$ (top) and H-D exchange of ethyl (dimethylamino)phenylsulfoxonium tetrafluoroborate by $D_2O$ $^1$H NMR spectra in $D_2O$. as described in Example 2 below.

Applicants examined the H-D exchange to test the possibility of in-situ production of ylide 7 in aqueous solution. FIG. 13A shows H-D exchange of ethyl (dimethylamino)phenylsulfoxonium tetrafluoroborate by $D_2O$ $^1H$ NMR spectra in $CDCl_3$. FIG. 13B shows H-D exchange of ethyl (dimethylamino)phenylsulfoxonium tetrafluoroborate by $D_2O$ $^1H$ NMR spectra in $O_2O$. All the protons of the ethyl (dimethylamino)phenylsulfoxonium tetrafluoroborate 6 were identified from the $^1H$ NMR spectrum of the compound in $CDCl_3$. The signal for methylene protons disappeared when Compound 6 was dissolved in $D_2O$. No base was needed to deprotonate the methylene group of compound 6. This indicates that water is more basic than Compound 6, which is consistent with the previously reported lower pKa of Compound 6 (~14.4) than water (~31.2) in DMSO. Based on this H-D exchange data, it is concluded that substituted ylide 7 can be generated in-situ in aqueous base.

Next, Applicants carried out the aqueous copolymerization of ethyl (dimethylamino)phenylsulfoxonium tetrafluoroborate 6 with trimethylsulfoxonium iodide 4 by trihexylborane in 50% NaOH solution/DCM mixture at 40° C. under $N_2$ (Scheme 3-5). The molar ratio of 6:4 was varied from 1:9 to 1:3. In a typical experiment, a two-neck round bottom flask was charged with surfactant TBAI, salts 6 and 4, followed by a small amount of DCM. After adding aqueous 50% NaOH into the reaction mixture, the DCM layer immediately turned bright yellow, a color which is characteristic for the (dimethylamino)phenylsulfoxonium ylide family 1. The mixture was heated to 40° C., and a DCM solution of B(hexyl)$_3$ was quickly added via a syringe. The reaction was monitored by the yellow color of substituted ylide 7. After the disappearance of the yellow color, the reaction was kept under $N_2$ for another 2 h, which was sufficient for the consumption of trimethylsulfoxonium iodide 4. The introduction of a secondary ylide precursor 6, resulted in a decreased catalytic activity of the organoborane initiator/catalyzed reaction. Increasing the feed ratio of 6:4 from 1:9 to 1:6 to 1:3, extended the reaction time from 3 h to 5 h to 12 h. After consumption of both salts, the reaction was allowed to settle before separating the bottom aqueous 50% NaOH with a pipette. The reaction residue was precipitated with methanol to afford a white waxy polymer product. The resultant material is viscous, which is problematic for filtration. Therefore, the polymer was purified by separating the clear liquid on the top of the precipitation solution with a pipette. The white product at the bottom of the flask can be further washed with methanol. The final clean product can be transferred into a vial as a milky suspension in $Et_2O$. After drying under high vacuum, the yield of the product varied from 81% to 99%. The copolymerization product results in a methyl-branched polymethylene 11, a material with similar chemical composition as an ethylene-propylene copolymer.

Scheme 2-5, below, shows the aqueous copolymerization of trimethylsulfoxonium iodide 4 and ethyl (dimethylamino) phenylsulfoxonium tetrafluoroborate 6 by B(hexyl)$_3$ in 50% NaOH solution/DCM mixture.

Scheme 2-5

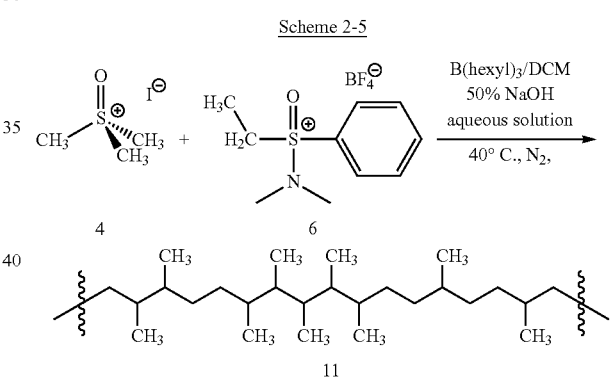

The aqueous copolymerization procedure technically less demanding than the traditional high temperature anhydrous copolymerization of ylides. The traditional copolymerization of dimethylsulfoxonium methylide 3 and (dimethylamino) phenylsulfoxonium ethylide 7 was carried out by slow addition of a solution of methylide 3 via a syringe pump to a solution of ethylide 7 containing trialkylborane. This order of addition creates a monomer 7-rich pool, which increases the probability of incorporating the sterically more hindered and less reactive secondary ylide 7. The reaction needs special attention, because the microstructure of the resultant polymer 11 is influenced by the rate of addition of monomer 3. For the aqueous copolymerization of ylide precursors, ylide precursors (salts) are added before the polymerization started and the final polymer 11 has microstructure that only depends on the feed ratio of salts 4:6. The aqueous copolymerization takes advantage of the different pKa's, solubility and reactivity between primary and secondary ylide precursors 4 and 6. In this regard, Scheme 2-6, blow, shows in-situ production of (a) dimethylsulfoxonium methylide 3, and (b) (dimethylamino)phenylsulfoxonium ethylide 7 in aqueous base.

Scheme 2-6

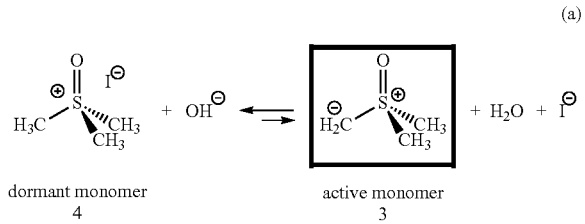

dormant monomer
4 active monomer
3 molecular weights, calculated from the feed ratio of total salts to trihexylborane, are in good agreement with the experimental values from GPC analysis. Furthermore, as the incorporation ratio of substituted ylide precursor 6 increases, the PDI of the corresponding polymer decreases. This is due to disruption of the polymer crystalline domain by the methyl branches introduced via 6 (vide infra).

Table 2-1. Summary of GPC, $^1$H NMR and $^{13}$C NMR data of poly(ethylidene-co-methylidene) 11 from the aqueous copolymerization of ethyl (dimethylamino)phenylsulfoxonium tetrafluoroborate 6 and trimethylsulfoxonium iodide 4.

TABLE 2-1

| | theoretical | | Experimental | | | | |
|---|---|---|---|---|---|---|---|
| entry | [M]/[E]$^a$ | MW$_{th}{}^a$ [g mol$^{-1}$] | yield [%] | [M]/[E]$^b$ | [M]/[E]$^c$ | M$_n{}^d$ [g mol$^{-1}$] | M$_w{}^d$ [g mol$^{-1}$] | PDI$^d$ |
| 1 | 9.56:1 | 1,488 | 99 | 10.09:1 | 14.11:1 | 1,565 | 5,739 | 3.67 |
| 2 | 6.31:1 | 1,558 | 81 | 6.07:1 | — | 1,281 | 2,725 | 2.13 |
| 3 | 3.36:1 | 1,502 | 99 | 3.71:1 | 5.09:1 | 1,521 | 3,051 | 2.00 |

$^a$[M]/[E] represents the molar ratio of methylidene to ethylidene [CH$_2$]/[CHCH$_3$]. Theoretical [M]/[E] and MW$_{th}$ are calculated from the feed molar ratio of [4]:[6]:[B(hexyl)$_3$];
$^b$[M]/[E] is calculated from $^1$H NMR;
$^c$[M]/[E] is calculated from quantitative $^{13}$C NMR;
$^d$M$_n$, M$_w$, and PDI are GPC results.

-continued (b)

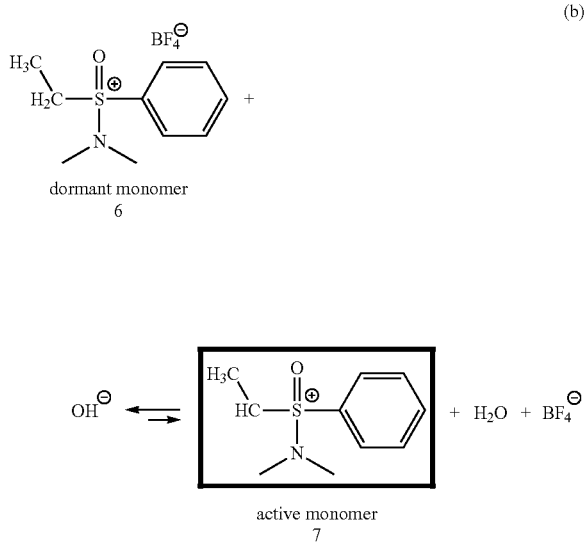

dormant monomer
6 active monomer
7

Trimethylsulfoxonium iodide 4 has a high pKa (~19), and has little solubility in DCM or 50% NaOH, so methylide 3 is produced slowly during the reaction. On the other hand, the production of ethylidene 7 is very efficient, because ethyl (dimethylamino)phenylsulfoxonium tetrafluoroborate 6 has a lower pKa (14.4), and dissolves well in DCM. Therefore, a reaction system rich in secondary ylide 7 is generated naturally, and methylide 3 is gradually added to the system and because of its low solubility it is slowly generated.

Product poly(ethylidene-co-methylidene) 11 was analyzed by both NMR and GPC. The results are summarized in Table 2-1, below. Relativity low molecular weight oligomers (MW$_{th}$=~1500 g/mol) were prepared for this study to simplify analysis. The aqueous copolymerization maintains a certain degree of molecular weight control. The theoretical The microstructure of the resultant polymer 11 was investigated by both $^1$H NMR and quantitative $^{13}$C NMR spectra. Of particular interest is the polymer composition, the relative amount of methylene (CH$_2$) to ethylidene (CHCH$_3$) groups in the polymer. If both salts 6 and 4 were consumed completely without any decomposition or side reactions, the incorporation ratio between methylidene (CH$_2$) and ethylidene (CHCH$_3$) into the polymer 11 should be controlled by the feed ratio of salt 6 and 4. Therefore, the polymer composition may be adjusted by simply adjusting the ratio of the monomer precursors. The NMR samples were prepared as solutions of polymer 11 with a relaxation agent Cr(acac)$_3$ (8-12 mg) in 1,1,2,2,-tetrachloroethane-d$_2$ (0.7 mL). Prior to NMR experiments, samples were heated in a heating block at 130° C. for at least 5 h to achieve sample homogenization. All the NMR experiments were performed at 125° C. Quantitative $^{13}$C NMR experiments were acquired with inverse-gated decoupling. The interpulse relaxation time (T$_1$) was 6 s, and the number of scans was typically ~5,000 in order to achieve adequate signal to noise ratio. DEPT135 experiments were performed with a T$_1$ of 4 s, and ~5,000 scans.

Figure 14:
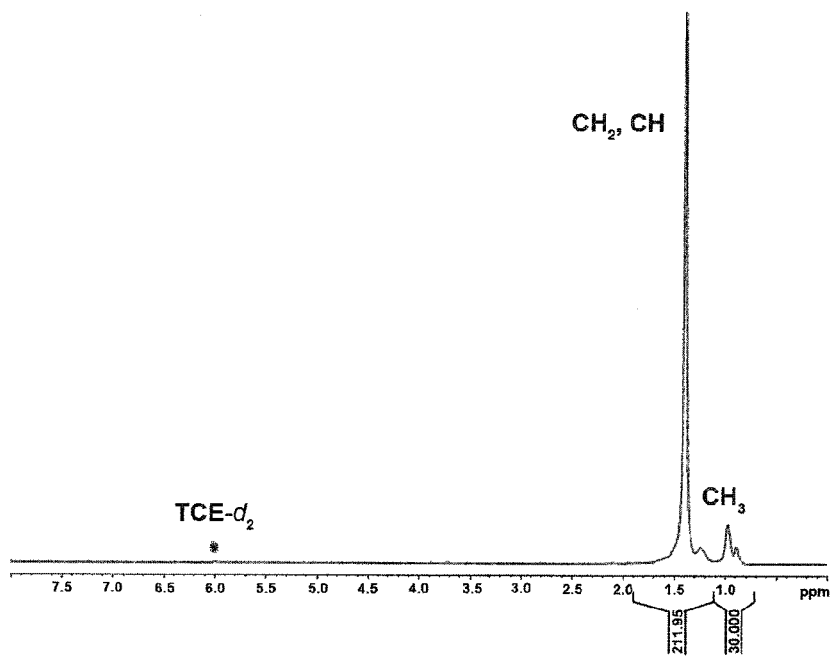
FIG. 14 shows the $^1$H NMR spectrum of poly(methylidene-co-ethylidene) 11 produced from the aqueous copolymerization of trimethylsulfoxonium iodide 4 and ethyl (dimethylamino)phenylsulfoxonium tetrafluoroborate 6 (Table 2-1, entry 1), as described in Example 2 below.

FIG. 14 shows the $^1$H NMR spectrum of poly(methylidene-co-ethylidene) 11 produced from the aqueous copolymerization of trimethylsulfoxonium iodide 4 and ethyl (dimethylamino)phenylsulfoxonium tetrafluoroborate 6 (Table 2-1, entry 1). Because of chain transfer and chain walking during traditional olefin polymerizations, most polyolefin materials contain various types and amounts of branches, all of which exhibit similar methylene, methane, and methyl signals in the $^1$H NMR spectra.

As a result, $^1$H NMR spectrometry is not very useful for microstructure characterization of these materials. However, in our case, the product has a perfectly linear carbon backbone containing only one type of branch, the one introduced through the substituted ylide precursor 6. Therefore, $^1$H NMR spectrometry can be applied here for the analysis of polymer composition. Since the ratio of initiator B(hexyl)$_3$ to monomers is relatively small, signals from the alkyl group in B(hexyl)$_3$ are omitted. Thus, the number of methine protons is equal to one third of that of methyl protons in the region of 0.7-1.1 ppm, and the amount of methylene protons can be obtained by subtraction of the amount of methine protons from the total content in the range of 1.1-2.0 ppm. The compositional ratio can be expressed by the following Equation 2-1.

$$[M]/[E] = \left(\frac{[CH_2 + CH] - [CH_3]/3}{2}\right) / \left(\frac{[CH_3]}{3}\right)$$

As shown in Table 2-1 above, the ratio of methylidene to ethylidene ([M]/[E]) from $^1$H NMR analysis is very close to that estimated from the feed ratio of 4:6, indicating excellent control of polymer composition.

After the confirmation of well-controlled ethylidene incorporation, quantitative $^{13}$C NMR was used, together with DEPT135 experiments, to estimate the microstructure of polymer 11, including the structure and distribution of branches. This detailed structural informations can provide us insight into the polymerization mechanism.

$^{13}$C NMR spectroscopy can provide information of polymer microstructure, which has been nearly impossible to measure by other spectroscopic techniques. Because of its excellent structural sensitivity, detection of long-chain branching in PE can be made at a level of one per ten thousand carbon atoms. Moreover, since it covers a wide chemical shift range (over 200 ppm), leading to well-delineated responses from carbons in slightly different chemical environments, it can achieve a sensitivity to polymer repeat unit sequence of lengths from two to as many as five, and even seven contiguous repeat units. Therefore, $^{13}$C NMR spectroscopy is useful in studying the microstructure of polymers. However, a fully quantified $^{13}$C NMR spectrum of polymer samples requires detailed attention and careful experimental setup. It suffers from unequal Nuclear Overhauser Effect (NOE) for different types of carbons and long spin-lattice relaxation times of carbon nuclei. In order to simplify the $^{13}$C NMR spectrum, broad-band decoupling is used to remove all $^1$H spin-spin coupling with $^{13}$C nuclei. At the same time, it also introduces NOE, a phenomena leading to enhancement in signal intensities independent of the population of contributing nuclei. Therefore, an inverse-gated decoupling method is applied to suppress NOE effects for different carbon nuclei. Another complication of quantitative $^{13}$C NMR is related to the relatively long relaxation time for carbon nuclei, which results in a very time-consuming process (usually 30-60 h) for quantitative spectra. Fortunately, this problem has been effectively circumvented by adding paramagnetic relaxation agents, like Cr(acac)$_3$ and Fe(acac)$_3$. With these reagents, quantitative $^{13}$C NMR spectrum can be obtained within 10-15 h.

Figure 15:
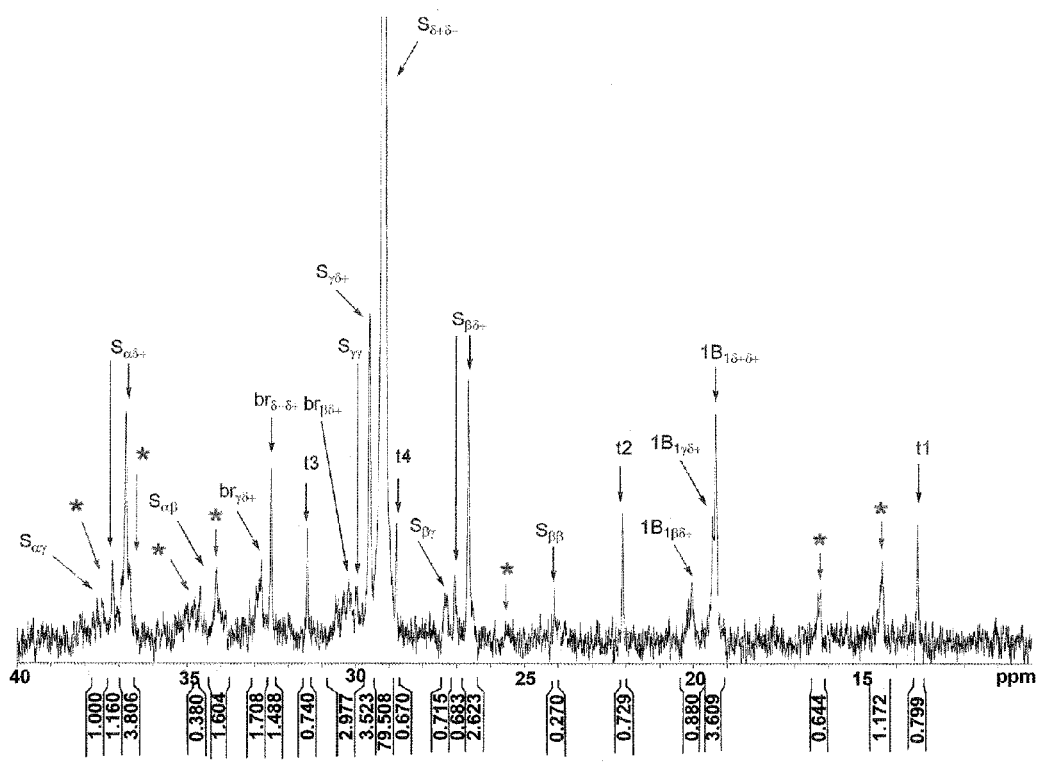
FIG. 15 shows a quantitative $^{13}$C NMR spectrum of poly (methylidene-co-ethylidene) 11 produced from the aqueous copolymerization of trimethylsulfoxonium iodide 4 and ethyl (dimethylamino)phenylsulfoxonium tetrafluoroborate 6 (Table 3-1, entry 1)), as described in Example 2 below.
Figure 16:
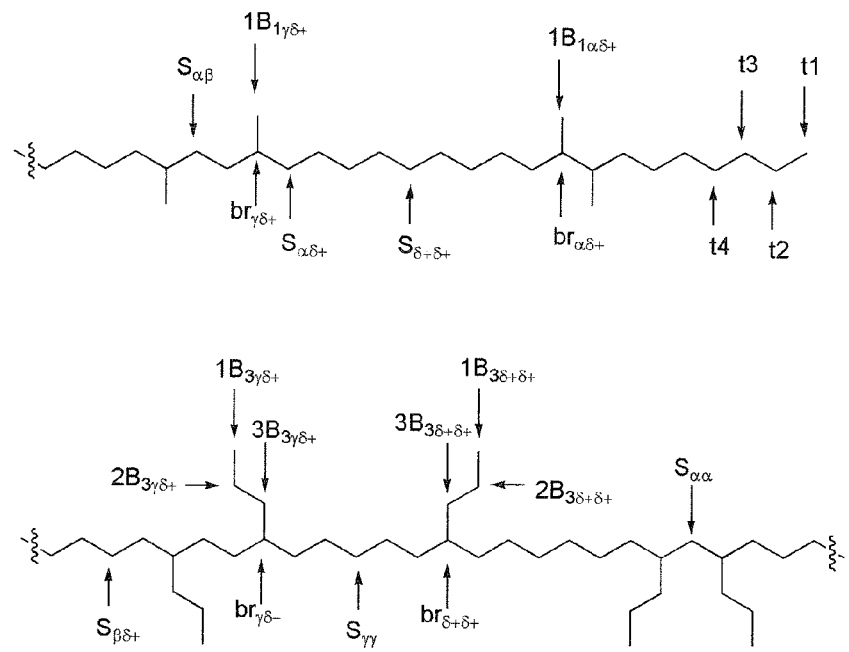
FIG. 16 shows the nomenclature of branched polymethylene, as described in Example 2 below.

FIG. 15 shows a quantitative $^{13}$C NMR of polymer 11 with partial annotation. FIG. 16 shows the nomenclature of branched polymethylene. Spectral assignments were made on the basis of the corresponding DEPT135 spectra, theoretical chemical shifts, literature assignments, and some model compounds. Carbons on side-chain branches are named by iB$_n$, where n is the length of the branch and i identifies the position of the carbon on the branch starting with the end methyl carbon as "1". For the backbone carbons, "S" and "br" are used to designate the methylene carbons and the methine carbons at the branch point, respectively. Since all of the carbons are located between two branch points, a pair of Greek letters is added as subscript to indicate their relative location to the nearest methine carbons in either direction. For example, S$_{\alpha\beta}$ denotes the methylene group that is bonded to the first branch point and two carbons away from the second branch point. 1B$_{3\beta\delta+}$ represents the methyl group on a propyl branch which is two carbons away from the first branch point and four or more carbons away from the second branch point. A methine carbon designated by br$_{\gamma\delta+}$ is located three carbons away from one side of the branch point and four or more carbons away from the other side of the branch point. Because the chemical shift is rarely effected by the neighboring carbons four or more carbons away, a carbon that is located four or more carbons away from a branch point is identified as δ+. The terminal carbons on the backbone are denoted as t1, t2, t3, t4 starting with the methyl end carbon as "t1".

Figure 17:
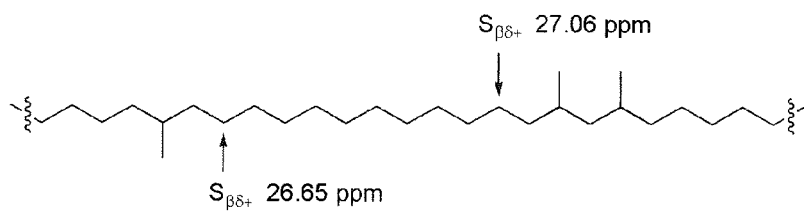
FIG. 17 shows sensitivity of $^{13}$C NMR, as described in Example 2 below.

In this example, initiator/catalyst B(hexyl)$_3$ is used to isolate the terminal carbons—t1, t2, t3, and t4—from branch points. This isolation prevents the contribution of branches on the chemical shift of terminal carbons, which can simplify the analysis of the $^{13}$C NMR spectra. In addition, these terminal carbons function as internal standards for quantitative analysis. FIG. 17 shows sensitivity of $^{13}$C NMR. Because of the effects of neighboring carbons, a carbon with same nomenclature sometimes corresponds to two or more peaks. For example, both the peak at 26.65 ppm and the peak at 27.06 ppm in the $^{13}$C NMR correspond to a S$_{\beta\delta+}$ carbon. The latter one represents the methylene group two carbons away from a pair of branch which is isolated by one carbon, while the previous peak identifies the methylene group two carbons away from a pair of branches with two or more carbons in between. Based on the DPET135 experiment, literature assignments of poly(ethylene-co-propylene) and some methyl-branched alkanes, most of the peaks can be assigned to various distinct chemical environments (FIG. 17).

Figure 3:
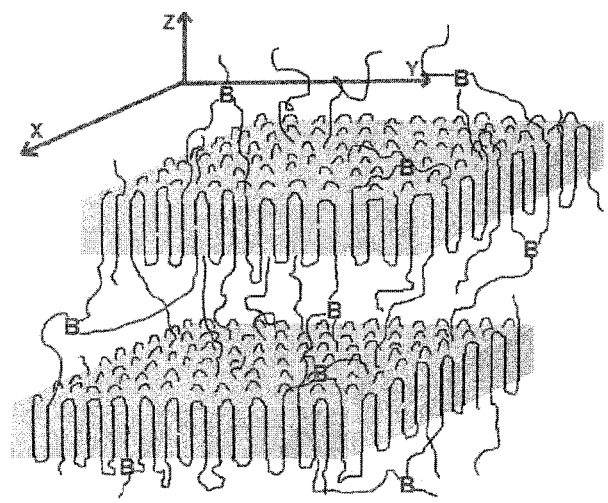
FIG. 3 is a schematic diagram of the orientation of lamellae and organoborane initiator/catalysts in the disk-like particles as described in Example 1 below.

However, some peaks (designated by *) on the $^{13}$C NMR spectrum do not correspond to any carbon in poly(ethylene-co-propylene) (FIG. 14). These peaks become more distinguishable on DEPT135 spectrum, because DEPT can separate methylene from the methyl and methine carbons with additional benefit of enhanced sensitivity (FIG. 15). After a literature search, it is found that the adjacent methyl carbons (1B$_1$) of head-to-head arrangements on polypropylene has two signals at 17.1 and 15.2 ppm, the corresponding branch points (br) are located at 38.7 and 37.9 ppm, and the methylene carbons (S) bonded to the head-to-head junctions are at 33.6 and 31.9 ppm. Considering the chemical shift difference caused from different NMR experimental conditions and reference peaks, these peaks match reasonably well with the unassigned peaks (*) at 16.0 and 14.2 ppm (1B$_{1\alpha\delta+}$), 37.1 and 36.4 ppm (br$_{\alpha\delta+}$), 34.7 and 33.8 ppm (S$_{\alpha\delta+}$) on the $^{13}$C NMR spectrum of poly(methylidene-co-ethylidene) 11 (FIG. 3-4). The signal at 23.8 ppm is denoted to a S$_{\beta\delta+}$ carbon of a branch pair. This correspondence indicates the existence of a pair of adjacent branches —CH(Me)-CH(Me)- in polymer 11. This is also confirmed by the $^{13}$C NMR spectrum of model compounds 6,7-dimethyldodecane and 10,11-dimethylicosane.

After the successful assignment of all the peaks in the quantitative $^{13}$C NMR spectrum to various chemical environments, one can calculate the ratio of methylidene to ethylidene ([M]/[E]) for polymer 11 (FIG. 14). A first-order Markovian statistical model is widely used for microstructure analysis of poly(ethylene-co-propylene). However, the model is not suitable in our case due to the existence of a contiguous branch pattern in polymer 11. Therefore, a simple normalization method will be applied here. Methyl branch (1B$_1$) is clearly separated from other signals on the spectrum, and used to calculate the amount of ethylidene [E]. Since every 1B$_1$ is attached to a methine branch point (br), the number of methine carbons is assumed to be equal to the number of methyl carbons. Thus, the number of methylene carbons [M] can be obtained by subtraction of one terminal methyl carbon and twice the number of $1B_1$ carbons from the total carbon number. The compositional ratio can be expressed by the following Equations 2-2 through 2-7.

Equations 2-2 Through 2-7

$$[M]/[E]=(N_{total}-2N_b-1):N_b \qquad \text{Eq. (3-2)}$$

$$I_t=(I_{t1}+I_{t2}+I_{t3}+I_{t4})/4 \qquad \text{Eq. (3-3)}$$

$$I_{total}=I_{br}+I_{1B1}+I_{t1}+I_{t2}+I_{t3}+I_{t4}+I_s \qquad \text{Eq. (3-4)}$$

$$N_{total}=I_{total}/I_t \qquad \text{Eq. (3-5)}$$

$$I_b=I_{1B1} \qquad (3\text{-}6)$$

$$N_b=I_b I_t \qquad \text{Eq. (3-7)}$$

Here, in order to minimize experimental errors, terminal signals, t1, t2, t3, and t4, are averaged to give average terminal peak intensity ($I_t$, Eq. 2-3), which is set as "one carbon" in polymer 11. The peak intensity of all the carbons can be added together to give the total peak intensity $I_{total}$, which can be normalized by $I_t$ to yield the total carbon number $N_{total}$ (Eq. 2-4, 2-5). The carbon number of methyl branch ($N_b$) can be calculated in a similar way (Eq. 2-6, 2-7). The results are also summarized in Table 2-1 above. The ratio of methylidene to ethylidene ([M]/[E]) from quantitative $^{13}$C NMR analysis is close to that estimated from the reaction feed ratio 4:6. The difference between experimental and theoretical values of [M]/[E] can be explained by the poor solubility of polymer 11 in 1,1,2,2,-tetrachloroethane-$d_2$, which makes it difficult to produce a good signal-to-noise ratio on quantitative $^{13}$C NMR spectra.

From quantitative $^{13}$C NMR spectra, one can also estimate the content of contiguous branches to the total amount of branches. Since poly(methylidene-co-ethylidene) 11 is built one carbon at a time, branches are either separated by one or more methylene carbons on the polymer backbone, or connected together to form contiguous branches —CH(Me)-CH(Me)-. Increasing the feed ratio of 6:4 from 1:9 to 1:3, results in an increase of contiguous branch content from 29% to 52%. More interestingly, a branch pattern containing three or more adjacent methyl branches, evidenced by the peak at 14.67 and 11.59 ppm, can be obtained with feed ratio of 6:4 at 1:3 (FIG. 3-8). These observations can be understood by the fact that, with a higher concentration of ethylidene monomer, there is a stronger propensity to add another ethylidene following one ethylidene addition. These results promoted us to reexamine the homopolymerization of ethyl (dimethylamino) phenylsulfoxonium tetrafluoroborate 6 in aqueous base.

Figure 18:
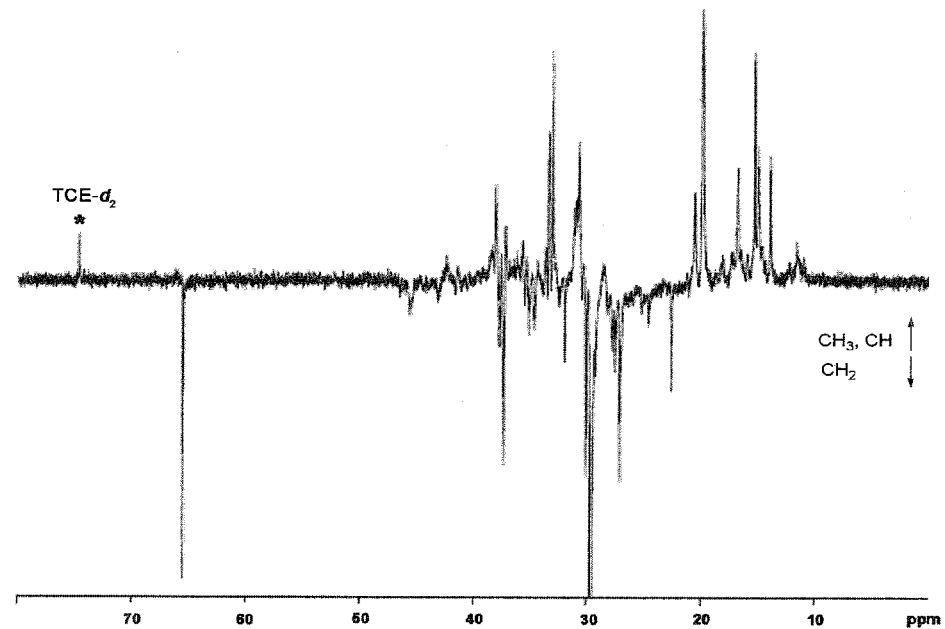
FIG. 18 is a DEPT135 spectrum of poly(methylidene-co-ethylidene) (Compound 11 of Example 2) (Table 2-1, entry 3).

FIG. 18 is a DEPT135 spectrum of poly(methylidene-co-ethylidene) (Compound 11 of this Example 2) (Table 2-1, entry 3). The homopolymerization of (dimethylamino)phenylsulfoxonium tetrafluoroborate 6 was attempted by addition of B(hexyl)$_3$ to a suspension of salt 6 in aqueous 50% NaOH/DCM mixture at 40° C. under N$_2$. A 150:1 ratio of salt 6 to B(hexyl)$_3$ was used (Scheme 3-7). Unfortunately, the yellow color, characteristic of the ylide 7, persisted throughout the reaction even after 48 h, and no polymer was isolated after the reaction. The failure of the homopolymerization of 6 most likely results from the steric congestion of key organoborane intermediate 12 after the initial homologation. The steric hindrance at the catalytic center 12 tends to stop its reactivity toward another secondary ylide monomer 7.

The following Scheme 2-7 shows an attempted aqueous homopolymerization of ethyl (dimethylamino)phenylsulfoxonium tetrafluoroborate 6 by B(hexyl)$_3$ in 50% NaOH solution/DCM mixture.

Scheme 2-7

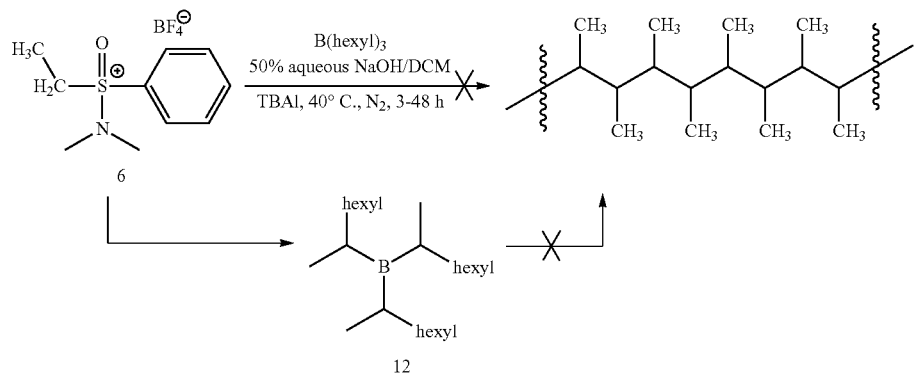

In this example, an aqueous copolymerization of trimethylsulfoxonium iodide 4 and ethyl (dimethylamino)phenylsulfoxonium tetrafluoroborate 6 was successfully developed to afford poly(methylidene-co-ethylidene) 11, which has similar chemical composition as polymer(ethylene-co-propylene). In this case, the carbon backbone is built up one carbon at a time from $CH_2$ and $CHCH_3$ fragments. A contiguous branch pattern, which cannot be achieved by other polymerizations, was obtained from the aqueous copolymerization. Moreover, the reaction provides a good control of molecular weight and composition for the polymer through adjusting the feed ratio between salts and initiator/catalyst. It also proves the compatibility of alkyl(dimethylamino)phenylsulfoxonium tetrafluoroborate family 5 with the aqueous polyhomologation reaction. Therefore, the extensive structural variation of alkyl(dimethylamino)arylsulfoxonium tetrafluoroborates 5 allow for various substituents to be installed onto the branch of polymethylene.

Propyl-Substituted Linear Polymethylene

Figure 19:
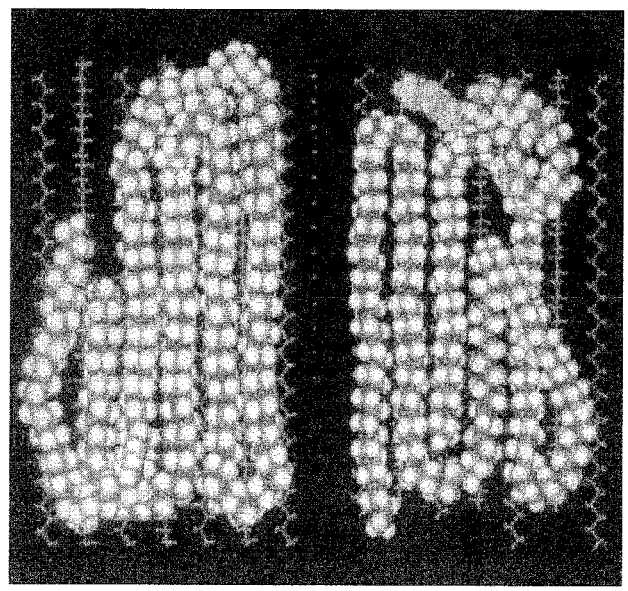
FIG. 19 is a schematic illustration for the formation of a tie chain, as described in Example 2 below.

The physical properties and applications of PE strongly depend on its microstructure, including the nature of any and all substituents. The introduction of short alkyl branches along the polyethylene backbone is known to increase the inter-crystalline connectivity, or so called the tie chain concentration. FIG. 19 is a schematic illustration for the formation of a tie chain. Because of their steric hindrance, the short alkyl branches can disrupt the folding process of linear polymer chains and push them out of the lamellar crystalline domain to form tie chains (FIG. 19). It has been proposed that the length and amount of α-olefin comonomer have a strong influence on the tie chain concentration.

Typically, the short alkyl branches are incorporated into polyethylene through the use of higher carbon α-olefin comonomers, such as butene, hexene, or octane, in the copolymerization of ethylene. However, these comonomers commonly function as chain transfer agents and results in poorly defined microstructure. In the previous example, it was demonstrated that the aqueous copolymerization of trimethylsulfoxonium iodide 4 and alkyl(dimethylamino)phenylsulfoxonium tetrafluoroborates 5 can precisely control the incorporation ratio and length of the short chain branch. This great accuracy in defining the microstructure of polymer provides us an opportunity to better understand the structure-property relationship for hydrocarbon polymers. In the following section, a propyl-branched polymethylene is used to illustrate the concept.

The production of propyl-branched polymethylene requires butyl (dimethylamino)phenylsulfoxonium tetrafluoroborate 13 as comonomer in the aqueous polyhomologation. The synthesis of 13 started from alkylation of thiophenol with n-butyl bromide in basic aqueous solution, then follows a similar procedure used for the preparation of ethyl (dimethylamino)phenylsulfoxonium tetrafluoroborate 6, as shown in Scheme 2-8 below.

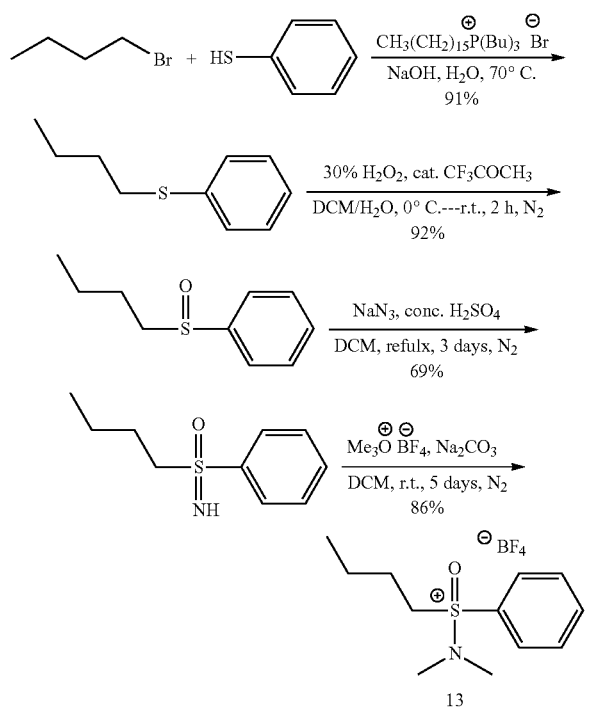

The copolymerization between butyl (dimethylamino) phenylsulfoxonium tetrafluoroborate 13 and trimethylsulfoxonium iodide 4 was carried out in a manner similar to that described in the copolymerization of 6 and 4, as shown in Scheme 2-9, below.

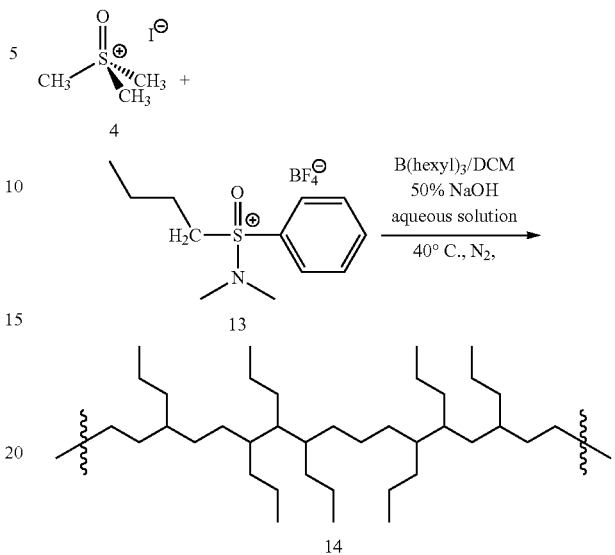

Specifically, Scheme 2-9 shows the aqueous copolymerization of trimethylsulfoxonium iodide 4 and butyl (dimethylamino)phenylsulfoxonium tetrafluoroborate 13 by B(hexyl)$_3$ in 50% NaOH solution/DCM mixture. Successful copolymerization by this scheme would result in a propyl-branched polymethylene 14, a material with similar chemical composition as poly(ethylene-co-pentene). The molar ratio of salts 13:4 varied from 1:9 to 1:3. When the alkyl group of 5 is changed from ethyl to butyl, the polymerization slows down. For example, when the molar ratio of 5:4 was 1:3, it took 2 days to consume butyl (dimethylamino)phenylsulfoxonium tetrafluoroborate 13 (indicated by the characteristic yellow color of substituted ylide solution), instead of 12 h for ethyl salt 6. This is perhaps not surprising in view of the fact that the longer alkyl substituent would increase the steric hindrance around the catalytic organoborane center.

Figure 20:
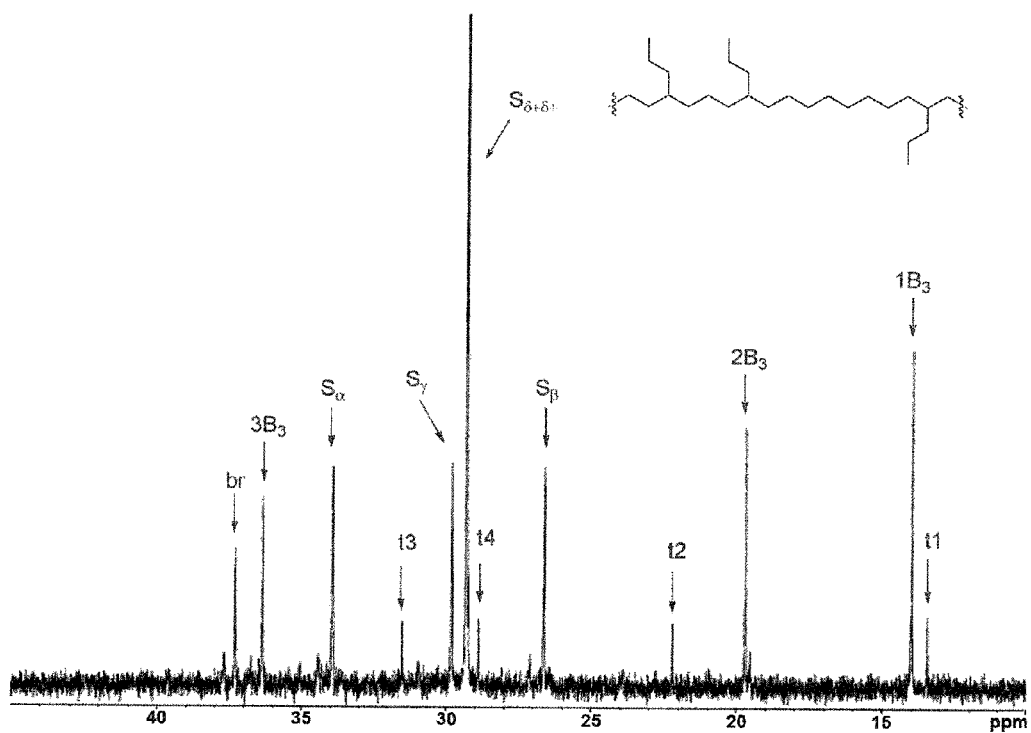
FIG. 20 is a representative $^{13}$C NMR spectrum of poly (methylidene-co-butylidene) 14 (Table 2-2, entry 1), as described in Example 2 below.

FIG. 20 is a representative $^{13}$C NMR spectrum of poly (methylidene-co-butylidene) 14 (Table 2-2 below, entry 1). As seen in FIG. 20, the incorporation of propyl branches was confirmed by $^{13}$C NMR. Both $^1$H NMR and quantitative $^{13}$C NMR spectra revealed good correspondence between the observed incorporation ratio between methylidene to butylidene and the calculated ratio based on the stoichiometry of the monomer precursors (Table 2-2). The possible explanation for the larger error introduced from the $^1$H NMR analysis is that the signal of terminal methyl group overlaps with the one from the branch methyl groups and is therefore omitted. The reaction resulted in precise control of the branch incorporation over a wide range of 0.09-0.20. However, no further information about microstructure, including the substituent pattern and distribution, can be obtained from the $^{13}$C NMR spectra, since standard samples of ethylene-pentene copolymer or propyl-branched alkanes are not available for peak assignment.

The following Table 2-2 provides a summary of GPC, $^1$H NMR and $^{13}$C NMR data of poly(methylidene-co-butylidene) 14 from the aqueous copolymerization of butyl (dimethylamino)phenylsulfoxonium tetrafluoroborate 13 and trimethylsulfoxonium iodide 4.

TABLE 2-2

| | theoretical | | Experimental | | | | | |
|---|---|---|---|---|---|---|---|---|
| entry | [M]/[B][a] | $MW_{th}{}^a$ [g mol$^{-1}$] | yield [%] | [M]/[B][b] | [M]/[B][c] | $M_n{}^d$ [g mol$^{-1}$] | $M_w{}^d$ [g mol$^{-1}$] | PDI[d] |
| 1 | 9.62:1 | 1,558 | 99 | :1 | 9.64:1 | 1,258 | 1,908 | 1.52 |
| 2 | 6.50:1 | 1,502 | 98 | :1 | 6.50:1 | 1,298 | 1,925 | 1.48 |
| 3 | 3.36:1 | 1,474 | 80 | :1 | 4.14:1 | 975 | 1,296 | 1.33 |

[a] [M]/[B] represents the molar ratio of methylidene to butylidene [CH$_2$]/CHCH$_2$CH$_2$CH$_3$]. Theoretical [M]/[B] and MW$_{th}$ are calculated from the feed molar ratio of [13]:[4]:[B(hexyl)$_3$];
[b] [M]/[B] is calculated from $^1$H NMR;
[c] [M]/[B] is calculated from quantitative $^{13}$C NMR;
[d] $M_n$, $M_w$, and PDI are GPC results.

Figure 21:
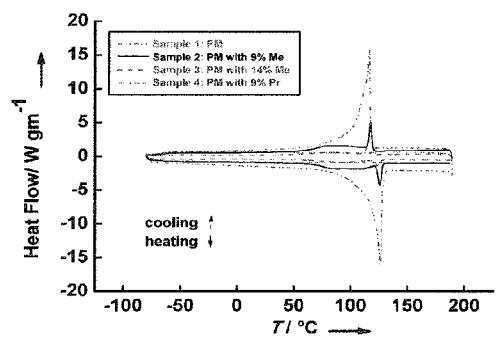
FIG. 21 shows DSC curves of polymethylene samples with various branch length and concentration, as described in Example 2 below.

DSC was utilized to study the effect of length and concentration of various branches, including methyl and propyl, on the crystallization of polymethylene. FIG. 21 shows DSC curves of polymethylene samples with various branch length and concentration. Also, Table 2-3 (below) summarizes the characteristics and DSC results for polymethylene samples with different branch length and concentration. For the sake of comparison, all samples had similar molecular weight. From the DSC traces (FIG. 21), it is obvious that the introduction of branches significantly reduce the crystallinity of polymethylene. When a methyl branch is incorporated, beside a major $T_m$ at ~125° C. and $T_c$ at ~115° C., an additional shoulder appears on the lower temperature side of both melting and cooling curves. Since $T_c$ and $T_m$ are strongly related to the thickness and unit cell structure of the corresponding lamellae, the lower $T_c$ and $T_m$ on the shoulders indicate the existence of a different kind of lamella, with a new unit cell structure with methyl-branches incorporated. As the content of methyl branch increases, the crystallinity decreases. These results are in accordance with those of Brookhart et al. and Wagener et al. who found that $T_m$ and crystallinity decreased with increasing amounts of methyl branch in the ethylene-propylene copolymer and ADMET polymer respectively. The length of branch also has an impact on the nature of thermal transition of polymethylene. A completely amorphous polymer is formed when 9% butyl branch is incorporated into polymer. This is a strong evidence for the disruption effect of branches on the polymer's crystalline domain.

necessary. Compared to the amorphous domain, the crystalline lamellae have a diminished accessibility for ylides. For polymethylene without branches, the high degree of crystallinity prevents (retards) chain growth for high molecular weight. The diminished accessibility can also explain in part the observed high PDI. When methyl or propyl branches are incorporated, the PDIs of the resultant polymers are generally lower. As discussed previously, the crystallinity decreases when branches are introduced into the polymer. The increased amorphous domain allows better exposure of the active propagating sites to free ylide, which allows access to all the organoboron centers with equal probability to propagate and achieve a lower PDI. To be expected, PDI decreases with the increase of branch length or content (Tables 2-1, 2-2 and 2-3). The diminished crystallinity also provides an opportunity to achieve higher molecular weight for branched polymethylene. This research is still continuing in our lab.

Phenylethyl-Substituted Linear Polymethylene

Scheme 2-10(a), below, shows the synthesis of poly(benzylidene) from phenyldiazomethane. Scheme 2-10(b) below shows the synthesis of poly(phenylpropylidene) from hydrocinnamaldehyde trans-1-amino-2,3-diphenylaziridine hydrazone.

TABLE 2-3

| Sample | branch | branch %[a] | $M_n{}^b$ [g mol$^{-1}$] | $M_w{}^b$ [g mol$^{-1}$] | PDI[b] | $T_c{}^c$ (° C.) | $T_m{}^c$ (° C.) | Cryst[c] (%) |
|---|---|---|---|---|---|---|---|---|
| 1 | — | — | 1,382 | 5,447 | 3.94 | 115 | 125 | 90 |
| 2 | Me | 9% | 1,565 | 5,739 | 3.67 | 87 & 117 | 86 & 126 | 44 |
| 3 | Me | 14% | 1,281 | 2,725 | 2.13 | 79 & 115 | 89 & 123 | 43 |
| 4 | Pr | 9% | 1,258 | 1,908 | 1.52 | — | — | — |

[a] branch concentration is calculated from NMR spretra;
[b] $M_n$, $M_w$, and PDI are GPC results;
[c] DSC results.

One can take advantage of the branches' disruptive effect on the polymer crystalline domain. The aqueous polyhomologation has a molecular weight limitation (below 7,000 g/mol) and broad PDIs, which are consequence of the heterogeneity of the polymerization system. For pure polymethylene without branches, after the initiation stage of the aqueous polyhomologation, the propagating polymer chains become insoluble and form a polymer phase. For propagation to continue the diffusion of active ylides into the polymer phase is Schemes 2-10 (a) and (b)

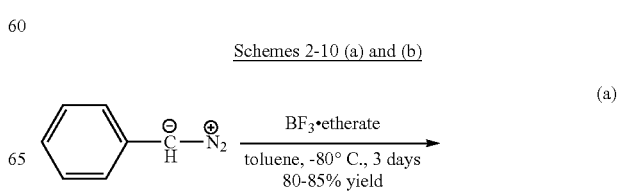

(a)

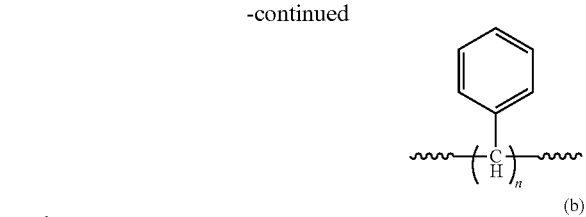

through an anionic polymerization mechanism. In both cases, the polymers are fully substituted polymethylenes, having one aromatic branch on each carbon of the polymer backbone.

Synthesis of phenyl-branched polymethylene form the traditional copolyhomologation of (dimethylamino)tolylsulfoxonium benzylide 15 with methylide 3 had been previously attempted, as shown in the following Scheme 2-11.

Scheme 2-11

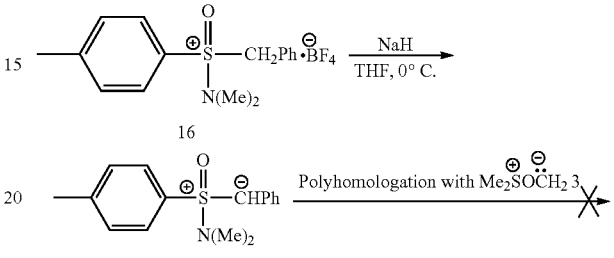

(Dimethylamino)tolylsulfoxonium benzylide 15 was prepared from deprotonation of benzyl (dimethylamino)tolylsulfoxonium tetrafluoroborate 16 with sodium hydride in THF at 0° C. However, it can be stored at −20° C. for only one day. When warmed up to room temperature, it rapidly decomposed. The instability of benzylide discourages its use in the traditional polyhomologation reaction.

Considering the in-situ generation of ylide and mild polymerization conditions, the aqueous polyhomologation may allow less stable ylides to be incorporated into polymers. To improve the stability of a phenyl-substituted ylide an ethylene linker 15 was added. The synthesis of modified phenyl-substituted ylide precursor 17 is shown in Scheme 2-12, as follows:

Scheme 2-12

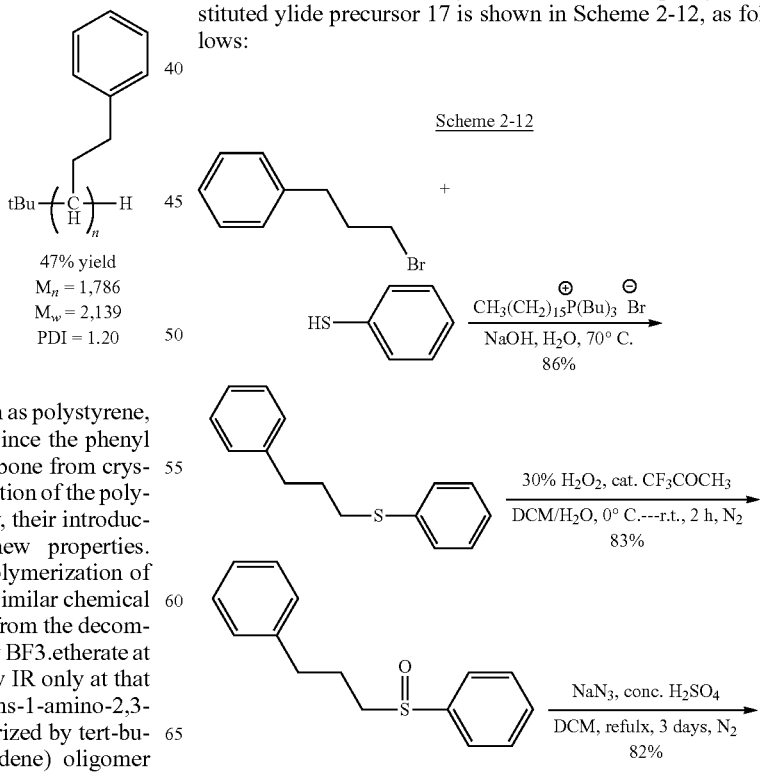

Polyethylene with aromatic branches, such as polystyrene, is another widely used synthetic polymer. Since the phenyl branches not only prevent the polymer backbone from crystallization, but also permit further transformation of the polymer through aromatic substitution chemistry, their introduction would impart the polymer with new properties. Polystyrene is produced mainly from the polymerization of styrene. Poly(benzylidene), a polymer with similar chemical structure as polystyrene, has been prepared from the decomposition of phenyldiazomethane catalyzed by BF3.etherate at −80° C. (Scheme 2-10a). It was identified by IR only at that time. Alternately, hydrocinnamaldehyde trans-1-amino-2,3-diphenylaziridine hydrazone can be polymerized by tert-butyl lithium to produce poly(phenylpropylidene) oligomer (Scheme 2-10b). The reaction was proposed to proceed

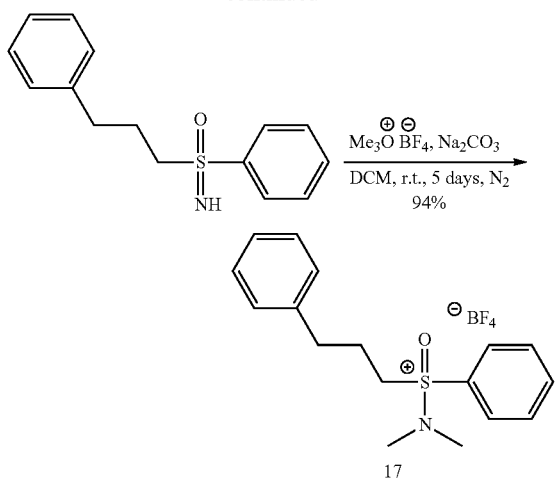

Salt 17 was prepared from alkylation of thiophenol with phenylpropyl bromide in basic aqueous solution, and then followed a similar procedure used for the preparation of ethyl (dimethylamino)phenylsulfoxonium tetrafluoroborate 6.

Standard experimental conditions were employed for aqueous copolymerization of trimethylsulfoxonium iodide 4 and phenylpropyl(dimethylamino)phenylsulfoxonium tetrafluoroborate 17 by B(hexyl)$_3$ in 50% NaOH solution/DCM mixture, as shown in Scheme 2-13 below.

Scheme 2-13

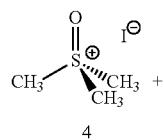

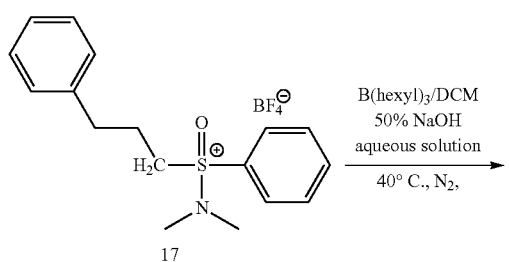

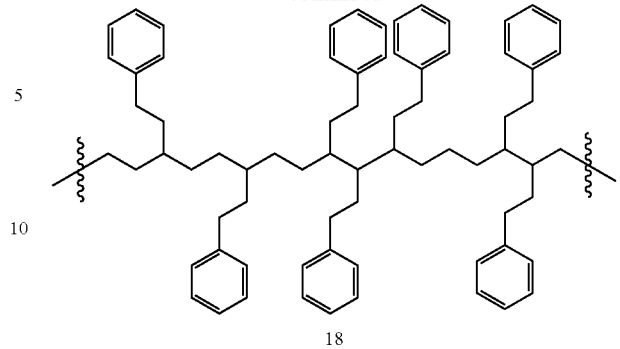

Changing the alkyl group of 5 from butyl to phenylethyl did not cause a substantial change in reactivity and the rate of the polymerization was similar. The molar ratio of salts 17:4 varied from 1:9 to 1:6. After the reaction, a phenylethyl-branched polymethylene 18 was obtained with high yield, which indicates complete consumption of salts 17 and 4.

Polymer 18 was characterized by GPC, $^1$H NMR and $^{13}$C NMR. Table 2-4 blow summarized the GPC, $^1$H NMR and $^{13}$C NMR data of poly(methylidene-co-phenylpropylidene) 18 from the aqueous copolymerization of phenylpropyl(dimethylamino)phenylsulfoxonium tetrafluoroborate 17 and trimethylsulfoxonium iodide 4. The reaction maintains good control of molecular weight. Polymer 18 has PDIs as low as 1.31, thanks to the effective disruption of polymethylene crystalline domain via phenylethyl branches. In addition, both $^1$H NMR and quantitative $^{13}$C NMR spectra revealed that the chemical composition of polymer 18 was precisely controlled by the feed ratio of monomer precursors 17 and 4. Because of the lack of standard samples, assignments were made only to major peaks (FIG. 12). No further information about polymer microstructure is available. Nevertheless, aromatic branches were successfully incorporated into polymethylene with great control of molecular weight, PDI, and chemical composition.

TABLE 2-4

| | theoretical | | Experimental | | | | |
|---|---|---|---|---|---|---|---|
| entry | [M]/[PP]$^a$ | MW$_{th}$$^a$ [g mol$^{-1}$] | yield [%] | [M]/[PP]$^b$ | [M]/[PP]$^c$ | M$_n$$^d$ [g mol$^{-1}$] | M$_w$$^d$ [g mol$^{-1}$] | PDI$^d$ |
| 1 | 10.00:1 | 1,566 | 86 | 12.26:1 | 10.07:1 | 1,221 | 1,632 | 1.34 |
| 2 | 6.86:1 | 1,516 | 84 | 8.9:1 | 6.89:1 | 996 | 1,305 | 1.31 |

$^a$[M]/[PP] represents the molar ratio of methylidene to phenylpropylidene [CH$_2$]/[CHCH$_2$CH$_2$Ph]. Theoretical [M]/[PP] and MW$_{th}$ are calculated from the feed molar ratio of [17]:[4]:[B(hexyl)$_3$];
$^b$[M]/[PP] is calculated from $^1$H NMR;
$^c$[M]/[PP] is calculated from quantitative $^{13}$C NMR;
$^d$M$_n$, M$_w$, and PDI are GPC results.

Figure 22:
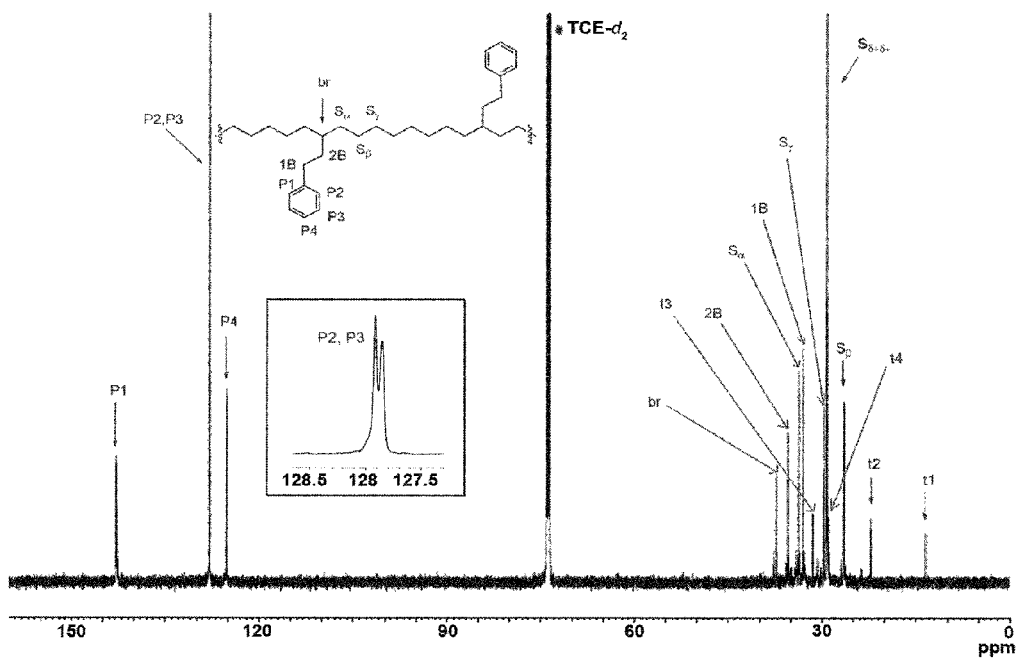
FIG. 22 is a representative $^{13}$C NMR spectrum of poly (methylidene-co-phenylpropylidene) 18 (Table 2-3, entry 1), as described in Example 2 below.

FIG. 22 is a representative $^{13}$C NMR spectrum of poly(methylidene-co-phenylpropylidene) 18 (Table 2-3, entry 1).

Thus, this example demonstrates an aqueous copolymerization of (dimethylamino)phenylsulfoxonium tetrafluoroborates 5 and trimethylsulfoxonium iodide 4 has been described for the controlled synthesis of functionalized polymethylene. The reaction uses an organoborane as the initiator/catalyst. (Dimethylamino)phenylsulfoxonium tetrafluoroborates 5 and trimethylsulfoxonium iodide 4 serves as the monomer reservoirs. Several substituted salts 5 have been synthesized. They can be deprotonated in aqueous base to produce substituted ylide 1 in-situ, which can then be copolymerized with unsubstituted ylide precursor 4 by trialkylborane initiator/catalyst. Polymethylene containing 9-21 mol % of methyl, propyl, or phenylethyl branches have been synthesized with controlled molecular weight, PDI and microstructure. The polymer is built up one carbon at a time from —CH$_2$— and —CHR— fragments. In addition, a new contiguous branch pattern was discovered in the resultant polymer. Considering the in-situ generation of ylide and the mild aqueous polymerization conditions, the aqueous copolymerization can provide access to various substituted carbon backbone polymers. One potential benefit of this invention is that it may be used to produce novel polymer materials which cannot be made by olefin polymerization. The pool of monomers is being expanded.

It is to be appreciated that the specific examples and embodiments described in detail herein are not limiting. For the substituted polymethylenes, there can be a very wide range of functional groups. Also, higher molecular weight polymers can easily be made as well given that the polymers are no longer crystalline and diffusion of ylide into the "liquid" polymer phase would be more facile.

It is to be further appreciated that, although the invention has been described hereabove with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the substantial absence of other elements, steps, members, components, compositions, reactants, parts or portions unless otherwise noted. All reasonable additions, deletions, modifications and alterations are to be considered equivalents of the described examples and embodiments and are to be included within the scope of the following claims.

What is claimed is:

1. A method for synthesizing a hydrocarbon or oxygen-containing hydrocarbon, said method comprising the steps of:
   a) forming a reaction mixture which comprises:
      a C1 carbon source;
      water
      an alkaline agent; and
      an alkyl Lewis acid;
         wherein the alkyl Lewis acid comprises an organic solvent such as dichloromethane in an amount effective to initiate or, at room temperature and atmospheric pressure, a reaction that forms the hydrocarbon or oxygen-containing hydrocarbon; and
   b) maintaining the reaction mixture at room temperature and ambient pressure for a period of time sufficient for occurrence of the reaction that forms the hydrocarbon or oxygen-containing hydrocarbon.

2. A method according to claim 1 wherein the C1 carbon source comprises a halide.

3. A method according to claim 2 wherein the halide comprises a methyl halide.

4. A method according to claim 1 wherein a microbial process is used to derive the C1 carbon source from biomass.

5. A method according to claim 1 wherein the C1 carbon source is derived from coal.

6. A method according to claim 1 wherein the C1 carbon source is derived from petroleum or natural gas.

7. A method according to claim 1 wherein the C1 carbon source is combined with a carrier.

8. A method according to claim 7 wherein the carrier comprises an onium salt.

9. A method according to claim 7 wherein the carrier comprises a sulfoxonium salt, sulfonium salt, phosphonium salt or other onium salt.

10. A method according to claim 7 wherein the carrier comprises dimethyl sulfoxide (DMSO).

11. A method according to claim 7 further comprising the step of recovering or regenerating the carrier.

12. A method according to claim 7, 8, 9, 10 or 11 wherein the C1 carbon source comprises a methyl halide.

13. A method according to claim 1 wherein the alkyl Lewis acid comprises trialkylborane.

14. A method according to claim 1 wherein the alkaline agent comprises sodium hydroxide.

15. A method according to claim 1 wherein:
    the C1 carbon source comprises a methyl halide;
    the alkaline agent comprises sodium hydroxide; and
    the alkyl Lewis acid comprises trihexylborane.

16. A method according to claim 15 wherein the methyl halide is combined with a carrier.

17. A method according to claim 16 wherein the carrier is DMSO.

18. A method according to claim 17 wherein the DMSO is recovered and recycled.

19. A method according to claim 1 wherein the hydrocarbon or oxygen-containing hydrocarbon is selected from the group consisting of polymers, small hydrocarbon molecules, waxes, fuels, oils and coatings.

20. A method according to claim 1 further comprising the step of using the hydrocarbon or oxygen-containing hydrocarbon as a starting material or reactant for the manufacture of another hydrocarbon, oxygen-containing hydrocarbon or other compound.

21. A method according to claim 1 wherein the hydrocarbon or oxygen-containing hydrocarbon is used as a starting material or reactant for the manufacture of a detergent.

22. A method according to claim 1 wherein the hydrocarbon or oxygen-containing hydrocarbon comprises polymethylene.

23. A method according to claim 1 wherein the C1 carbon source comprises methyl iodide derived from biomass.

24. A method according to claim 23 wherein the methyl iodide is carried by a carrier.

25. A method according to claim 24 wherein the carrier is selected from the group of: oniums; sulfoxoniums; sulfoniums; dimethylsulfoxide (DMSO) and phosphonium salts.

26. A method according to claim 22 wherein:
    the C1 carbon source comprises a methyl halide carried by a carrier selected from the group of: oniums; sulfoxoniums; sulfoniums; dimethylsulfoxide (DMSO) and phosphonium salts; and
    the alkyl Lewis acid comprises an organoborane;
    the reaction mixture further comprises an organic solvent; and the reaction comprises a polyhomologation reaction which forms polymethylene at room temperature and atmospheric pressure.

27. A method according to claim 26 wherein the C1 carbon source comprises dimethylsulfoxonium methylide.

28. A method according to claim 26 wherein the organoborane comprises a trialkylborane.

29. A method according to claim 28 wherein the trialkylborane comprises trihexylborane.

30. A method according to claim 26 wherein the organic solvent is selected from: methylene chloride and toluene.

* * * * *